United States Patent
Kwon et al.

(10) Patent No.: US 10,182,327 B2
(45) Date of Patent: Jan. 15, 2019

(54) METHOD AND DEVICE FOR TRANSMITTING/RECEIVING DATA IN MESH NETWORK USING BLUETOOTH

(71) Applicant: LG ELECTRONICS INC., Seoul (KR)

(72) Inventors: Younghwan Kwon, Seoul (KR); Jinkwon Lim, Seoul (KR); Jingu Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/560,886

(22) PCT Filed: Mar. 23, 2016

(86) PCT No.: PCT/KR2016/002948
§ 371 (c)(1),
(2) Date: Sep. 22, 2017

(87) PCT Pub. No.: WO2016/153278
PCT Pub. Date: Sep. 29, 2016

(65) Prior Publication Data
US 2018/0124550 A1    May 3, 2018

Related U.S. Application Data

(60) Provisional application No. 62/154,741, filed on Apr. 30, 2015, provisional application No. 62/137,777, filed on Mar. 24, 2015.

(51) Int. Cl.
*H04B 7/00* (2006.01)
*H04W 4/80* (2018.01)
(Continued)

(52) U.S. Cl.
CPC .............. *H04W 4/80* (2018.02); *H04W 4/00* (2013.01); *H04W 40/24* (2013.01); *H04W 84/18* (2013.01); *H04W 8/005* (2013.01); *H04W 88/04* (2013.01)

(58) Field of Classification Search
CPC ....... H04W 4/008; H04W 4/80; H04W 40/24; H04W 88/04; H04W 8/005; H04W 84/18
(Continued)

(56) References Cited

U.S. PATENT DOCUMENTS

| 2007/0258377 A1* | 11/2007 | Jantunen | H04W 8/005 370/241 |
| 2015/0081840 A1 | 3/2015 | Patil et al. | |
| 2016/0098469 A1* | 4/2016 | Allinson | H04L 67/1095 707/610 |

FOREIGN PATENT DOCUMENTS

| JP | 2008-141508 A | 6/2008 |
| KR | 10-2007-0035851 A | 4/2007 |

(Continued)

*Primary Examiner* — Eugene Yun
(74) *Attorney, Agent, or Firm* — Birch, Stewart, Kolasch & Birch, LLP

(57) ABSTRACT

The present invention relates to a method and device for setting the role of a device in a Bluetooth mesh network. According to the present invention, a method and device are provided which: receive a write request message including settings information for setting the role of a first device from a control device; transmit a response message as a response to the write request; transmit an advertising message including role information set by the settings information to a second device; and transmit a first message including first information on the first device to the second device.

13 Claims, 21 Drawing Sheets

(51) Int. Cl.
   *H04W 4/00*      (2018.01)
   *H04W 40/24*     (2009.01)
   *H04W 84/18*     (2009.01)
   *H04W 8/00*      (2009.01)
   *H04W 88/04*     (2009.01)

(58) Field of Classification Search
   USPC ...................................................... 455/41.2
   See application file for complete search history.

(56) References Cited

FOREIGN PATENT DOCUMENTS

| | | |
|---|---|---|
| KR | 10-2007-0094229 A | 9/2007 |
| KR | 10-2014-0114751 A | 9/2014 |

* cited by examiner

Mesh Network Protocol Stack (a) Role information

METHOD AND DEVICE FOR TRANSMITTING/RECEIVING DATA IN MESH NETWORK USING BLUETOOTH

CROSS REFERENCE TO RELATED APPLICATIONS

This application is the National Phase of PCT International Application No. PCT/KR2016/002948, filed on Mar. 23, 2016, which claims priority under 35 U.S.C. 119(e) to U.S. Provisional Application Nos. 62/137,777, filed on Mar. 24, 2015, and 62/154,741, filed on Apr. 30, 2015, all of which are hereby expressly incorporated by reference into the present application.

TECHNICAL FIELD

The present invention relates to a method and apparatus for transmitting and receiving data in a mesh network using Bluetooth, that is, a short-distance technology, in a wireless communication system and, more particularly, to a method and apparatus for transmitting and receiving data by setting the role of a device in a Bluetooth mesh network.

BACKGROUND ART

Bluetooth is an NFC technology standard allowing various devices to be wirelessly connected in a near field to exchange data. If two devices attempt to perform wireless communication using Bluetooth communication, a user may perform a procedure for discovering a Bluetooth device with which he or she wants to communicate and requesting a connection. In the present invention, the device may refer to equipment or an apparatus.

In this case, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since the transmission distance of Bluetooth is limited to a maximum of 100 m, Bluetooth is suitable for being used within a limited space.

DISCLOSURE

Technical Problem

An object of the present invention is to provide a method for transmitting and receiving data using a Bluetooth low energy (LE) technology.

Furthermore, an object of the present invention is to provide a method and apparatus for setting the role of a device when a mesh network is configured using Bluetooth.

Furthermore, an object of the present invention is to provide a method and apparatus for setting the role of a device in a mesh network using Bluetooth and transmitting and receiving data through a routing scheme.

Furthermore, an object of the present invention is to provide a method and apparatus for comparing the capabilities of devices and setting a relay role in forming a mesh network using Bluetooth.

Furthermore, an object of the present invention is to provide a method and apparatus for transmitting and receiving routing table information between devices in order to transmit and receive data through a routing scheme in a mesh network using Bluetooth.

Furthermore, an object of the present invention is to provide a method and apparatus for minimizing the number of times that a routing table is updated by determining whether or not to transmit and receive routing table information based on the type of device in a mesh network using Bluetooth.

Technical objects to be achieved in this specification are not limited to the aforementioned objects, and those skilled in the art to which the present invention pertains may evidently understand other technological objects from the following description.

Technical Solution

There is provided a method for setting the role of a first device in a mesh network of Bluetooth, includes the steps of receiving a write request message including setting information for setting the role of the first device from a control device; transmitting a response message as a response to the write request; transmitting an advertising message including role information set based on the setting information to a second device; and transmitting a first message including first information related to the first device to the second device.

Furthermore, in the present invention, if the second device performs a relay function, the first information includes first routing information for updating a routing table.

Furthermore, in the present invention, the first routing information includes destination information of a message and device information indicative of a next device to which the message is transmitted based on the destination information.

Furthermore, the present invention further includes the steps of transmitting a request message to request second information related to the second device to the second device and receiving a second message including the second information as a response to the request message, wherein the second information includes an ID indicative of the second device.

Furthermore, in the present invention, the second information includes second routing information for configuring a routing table.

Furthermore, in the present invention, the second routing information includes destination information of a message and device information indicative of a next device to which the message is transmitted based on the destination information.

Furthermore, in the present invention, if the second device does not perform a relay function, the first information is control information for controlling the first device.

Furthermore, the present invention further includes the steps of receiving a second message including second information related to the second device from the second device and transmitting a response message as a response to the second message, wherein the second information includes an ID indicative of the second device.

Furthermore, the present invention further includes the step of transmitting the second message to at least one surrounding device.

Furthermore, the present invention further includes the steps of receiving a request message to request network information related to the mesh network from the second device and transmitting a response message including the network information as a response to the request message, wherein the network information includes at least one of routing information related to a routing table of the second device and a network ID indicative of the mesh network.

Furthermore, the present invention further includes the steps of receiving a read request message to request role information of the first device from the control device and transmitting a response message including the role information as a response to the read request message.

Furthermore, the present invention provides a device, including a communication unit for communicating with the outside in a wired or wireless and a processor functionally connected to the communication unit, wherein the processor performs control so that a write request message including setting information for setting the role of a first device is received from a control device, a response message is transmitted as a response to the write request, an advertising message including role information set based on the setting information is transmitted to a second device, and a first message including first information related to the first device is transmitted to the second device.

Advantageous Effects

In accordance with the method for setting the role of a device in a mesh network of Bluetooth according to an embodiment of the present invention, the number of times that a routing table is updated can be minimized because the transmission and reception of routing information can be set depending on a device type.

Furthermore, the present invention can reduce the energy consumption of devices that form a mesh network by minimizing the number of times that a routing table is updated in a mesh network.

Furthermore, the present invention can improve network performance by minimizing data transmission for the update of a routing table in a mesh network.

Technical objects to be achieved in this specification are not limited to the aforementioned objects, and those skilled in the art to which the present invention pertains may evidently understand other technological objects from the following description.

MODE FOR INVENTION

The aforementioned objects, features and advantages of the present invention will become more apparent through the following detailed description related to the accompanying drawings. Hereinafter, the embodiments of the present invention will be described with reference to the accompanying drawings, in which the same reference numbers refer to the same elements throughout the specification. In describing the present invention, a detailed description of the known functions and constitutions related to the present invention will be omitted if it is deemed to make the gist of the present invention unnecessarily vague.

Hereinafter, a method and apparatus related to the present invention will be described in detail with reference to the accompanying drawings. The suffixes of elements used in the following description, such as "module" and "unit", are assigned or interchangeably used by taking into consideration only the easy of the writing of the specification, but they in themselves do not have different meanings or roles.

Figure 1:
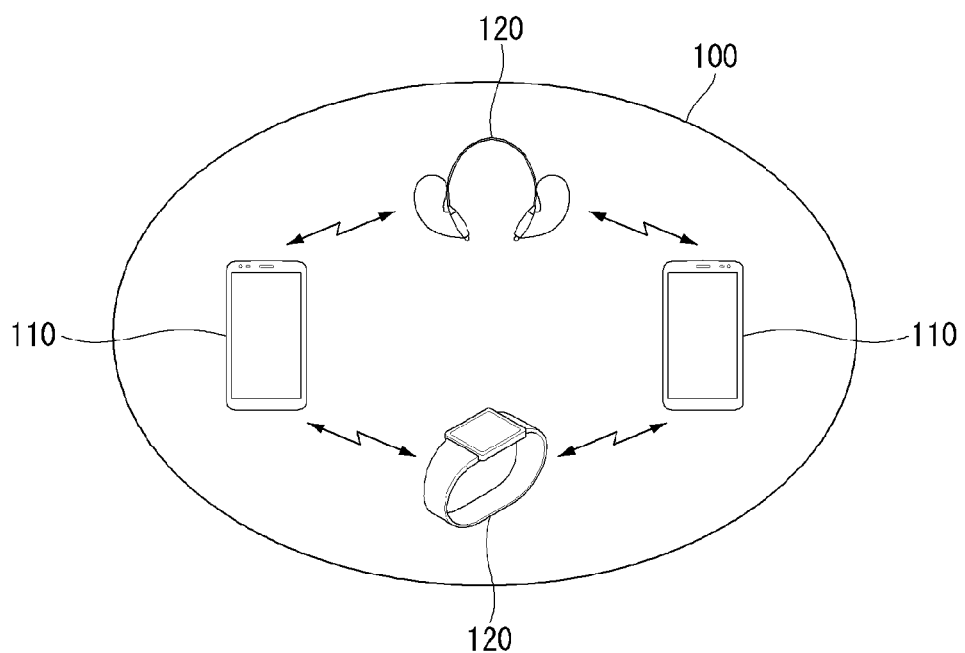
FIG. 1 is a schematic diagram showing an example of a wireless communication system using a Bluetooth LE technology to which the present invention may be applied.

FIG. 1 is a schematic diagram showing an example of a wireless communication system using a Bluetooth LE technology to which the present invention may be applied.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Furthermore, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Furthermore, in order to provide data information to the client device, the server device sends a notification message or an indication message to the client device in order to provide data information to the client device. Furthermore, the server device receives a confirmation message corresponding to the indication message from the client device.

Furthermore, in the process of transmitting and receiving notification, indication, and confirmation messages to and from the client device, the server device may provide data information to a user through a display unit or may receive a request input from the user through a user input interface.

Furthermore, in the process of transmitting and receiving message to and from the client device, the server device may read data from a memory unit or may write new data to the corresponding memory unit.

Furthermore, the single server device may be connected with a plurality of client devices, and may be easily reconnected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Furthermore, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Furthermore, the wireless communication system may configure personal area networking (PAN) through the Bluetooth technology. For example, in the wireless communication system, a private piconet may be established between devices to quickly and safely exchange files, documents, and the like.

Figure 2:
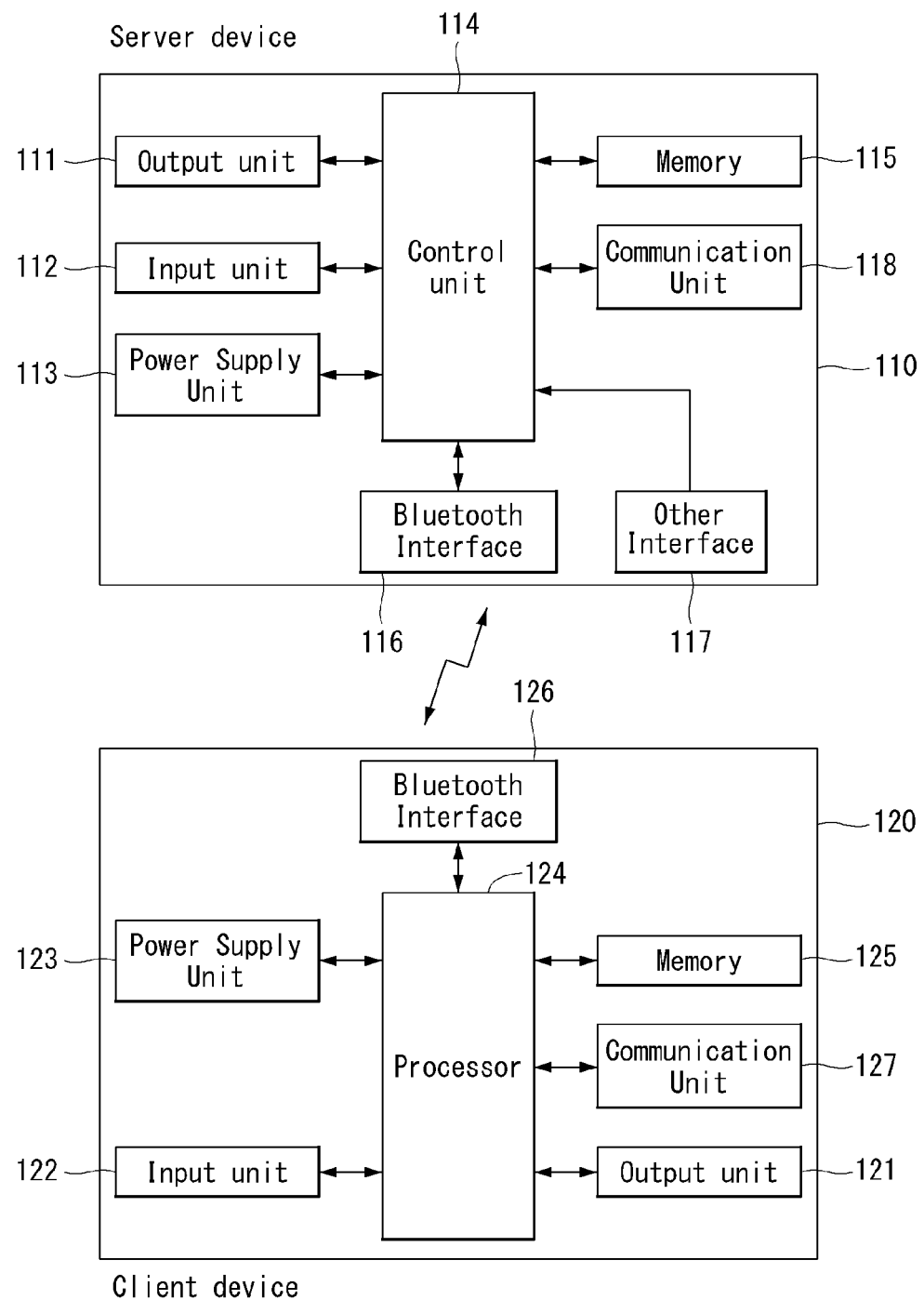
FIG. 2 shows an example of an internal block diagram of a device to which the present invention may be applied.

FIG. 2 shows an example of an internal block diagram of a device to which the present invention may be applied.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117 and the communication unit 118 are functionally connected to perform a method proposed in this disclosure.

Furthermore, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127 and the communication unit 128 are functionally connected and perform methods proposed in the present invention.

The Bluetooth interface 116, 126 refers to a unit (or module) capable of transmitting data, such as a request/response, a command, a notification, an indication/confirmation message, between devices.

The memory unit 115, 126 is a unit implemented in various types of devices in which various types of data are stored.

The processor 114, 124 refers to a module controlling an overall operation of the server device or the client device, which controls requesting the transmission of a message through the Bluetooth interface and other interface and processing a received message.

The processor 114, 124 may also be called a controller, a control unit or the like.

The processor 114, 124 may include application-specific integrated circuits (ASICs), other chip sets, logic circuits and/or data processing units.

The processor 114, 124 controls the communication units so that they receive an advertising message from the server device, controls the communication unit so that it transmits a scan request message to the server device and receives a scan response message from the server device in response to the scan request, and controls the communication unit so that it transmits a connection request message to the server device in order to establish a Bluetooth connection with the server device.

Furthermore, after a Bluetooth LE connection is established through a connection procedure, the processor 114, 124 controls the communication units so that they read or write data using an attribute protocol from the server device The memory unit 115, 125 may include read-only memory (ROM), random access memory (RAM), flash memory, a memory card, a storage medium and/or other storage devices.

The communication unit 118, 127 may include a baseband circuit for processing a wireless signal. If an embodiment is implemented in software, the aforementioned technology may be implemented as a module (process, function, etc.) performing the aforementioned function. The module may be stored in the memory unit and executed by the processor.

The memory unit 115, 125 may be present inside or outside the processor 114, 124 and may be connected to the processor 114, 124 through various well-known units.

The display unit 111, 121 refers to a module providing status information of the device, message exchange information and the like to a user through a screen.

The power supply unit 113, 123 refers to a module receiving external power or internal power and supplying power necessary for the operations of the components under the control of the controller 114, 124.

As discussed above, the BLE technology, has a relatively small duty cycle and power consumption may be significantly reduced through a low data rate, and thus, the power supply unit may supply power required for operations of the components even with small output power (10 mW(10 dBm) or less).

The user input interface 112, 122 refers to a module providing user input, such as a screen button, to the controller to enable a user to control the operation of the device.

Figure 3:
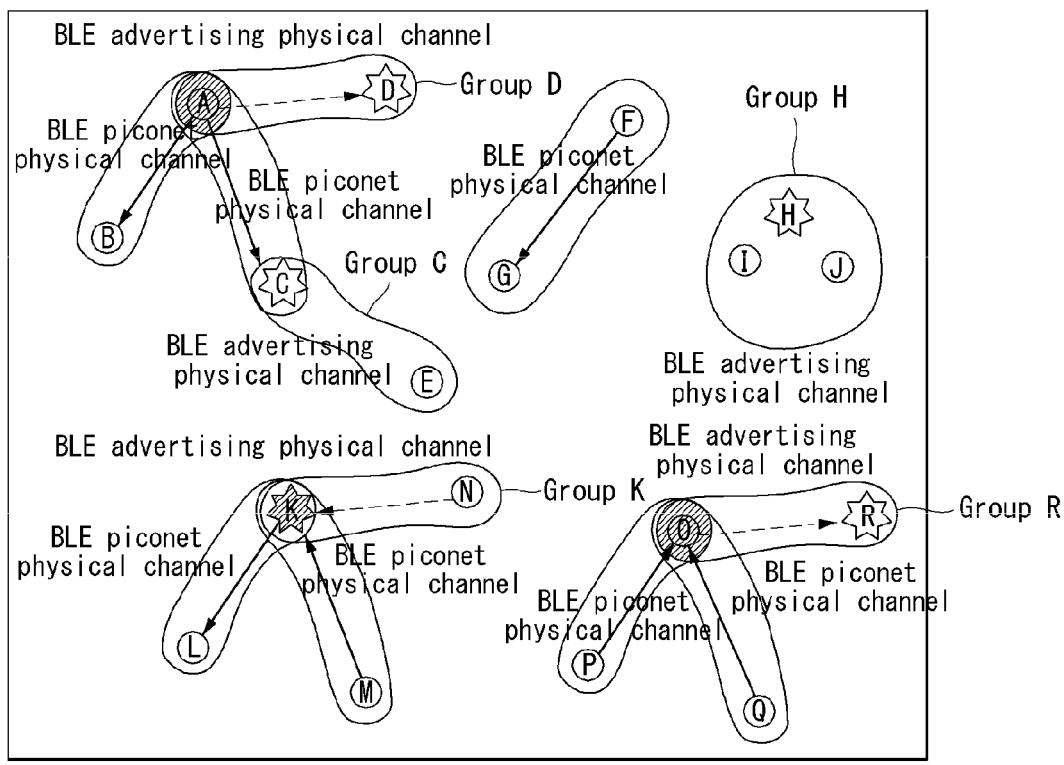
FIG. 3 shows an example of Bluetooth LE topology.

FIG. 3 is a view illustrating an example of the BLE topology.

Referring to FIG. 3, a device A corresponds to a master in a piconet (piconet A, the shaded portion) having a device B and a device C as slaves.

In this case, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. In this case, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertising event connectable in an advertising physical channel, and the device A is an initiator. The device A may establish a connection with the device D and add a device to the piconet A.

In group C, the device C advertises on an advertising physical channel using a certain type of an advertising event captured by the scanner device E.

The group D and the group C may use different advertising physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertising physical channel. The device H is an advertiser, and the devices I and J are scanners.

In the scatternet K, the devices K and L use a single BLE piconet physical channel. The devices K and M use another BLE piconet physical channel.

In group K, the device K advertises using an advertising event connectable on an advertising physical channel, and the device N is an initiator. The device N may establish a connection with the device K. In this case, the device K may be a slave of two devices and a master of one device at the same time.

In the scatternet O, the devices O and P use a single BLE piconet physical channel. The devices O and Q use another BLE piconet physical channel.

In group R, the device R advertises using an advertising event connectable on an advertising physical channel, and the device O is an initiator. The device O may establish a connection with the device R. In this case, the device O may be a slave of two devices and a master of one device at the same time.

Figure 4:
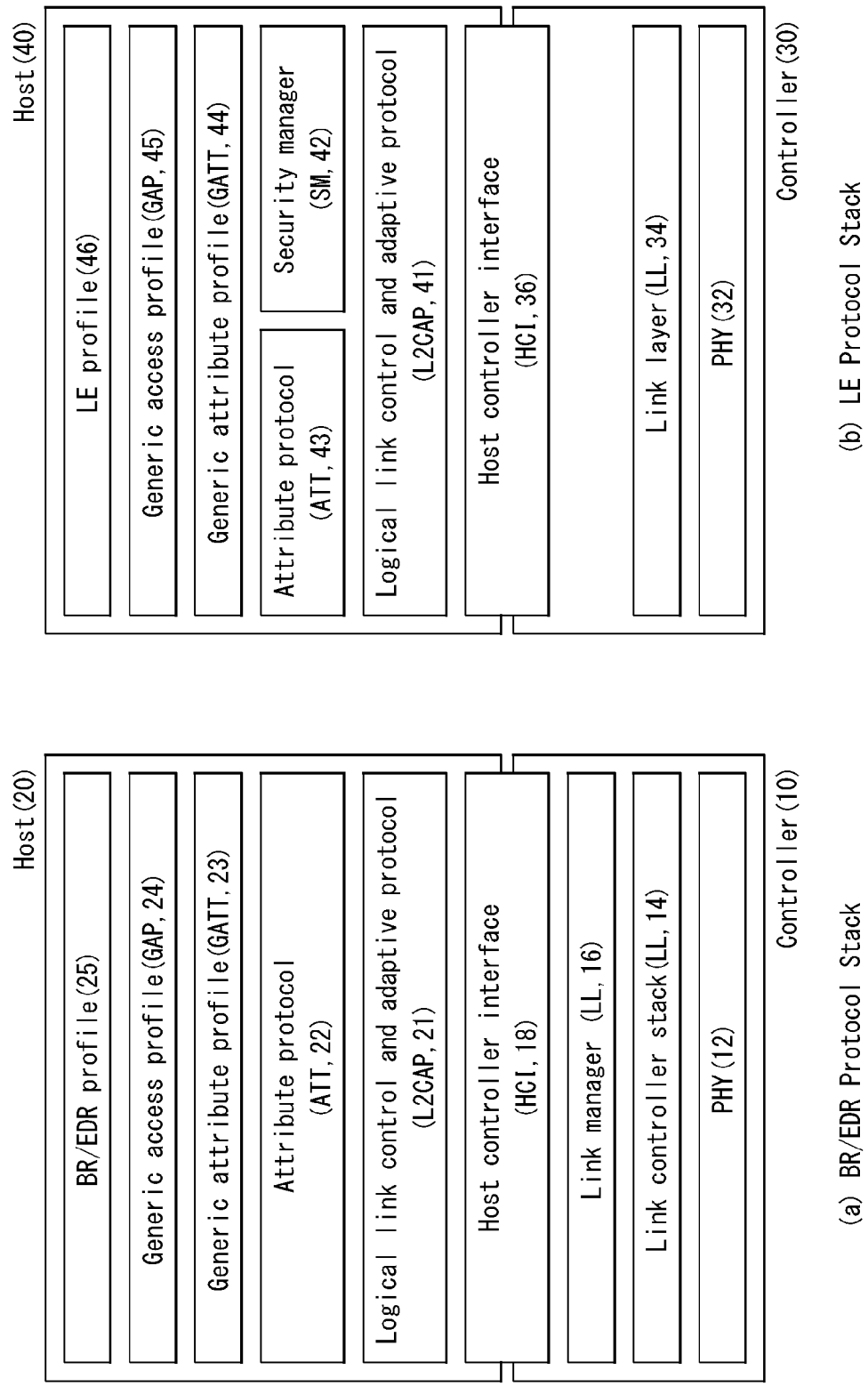
FIG. 4 is a diagram showing an example of Bluetooth communication architecture to which the present invention may be applied.

FIG. 4 is a diagram showing an example of Bluetooth communication architecture to which the present invention may be applied.

Referring to FIG. 4, (a) of FIG. 4 illustrates an example of a protocol stack of a Bluetooth basic rate (BR)/enhanced data rate (EDR), and (b) of FIG. 4 illustrates an example of a protocol stack of BLE.

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal. If Gaussian frequency shift keying (GFSK) modulation is used, the BR/EDR PHY layer 12 may transmit data by hopping 79 RF channels.

The BR/EDR baseband layer 14 functions to transmit a digital signal, select a channel sequence hopping 1400 times per second, and transmit a time slot having a length of 625 us for each channel.

The link manager layer 16 controls an overall operation (link setup, control and security) of a Bluetooth connection using a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs a security (authentication, pairing and encryption) function.

The host controller interface layer 18 provides an interface between the host module and the controller module to allow the host to provide a command and data to the controller and allow the controller to provide an event and data to the host.

The host stack (or host module 20) includes a logical link control and adaptation protocol (L2CAP) 21, a security manager (SM) 22, an attribute protocol (ATT) 23, a generic attribute profile (GATT) 24, a generic access profile (GAP) 25, and a BR/EDR profile 26.

The logical link control and adaptive protocol (L2CAP) 21 may provide a two-way channel for transmitting data to a specific protocol or a profile.

The L2CAP 21 may multiplex various protocols and profiles provided by a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 24 may operate as a protocol describing how the attribute protocol 23 is used when services are configured. For example, the generic attribute profile 24 may operate to define how the ATT attributes are grouped with services, and operate to describe features associated with the services.

Thus, the GATT 24 and the ATT 23 may use features in order to describe the status and services of a device and describe how the features are related and used.

The attribute protocol (ATT) 23 and profile 26 define a service (profile) using the Bluetooth BR/EDR and define an application protocol for exchanging data thereof, and the generic access profile (GAP) 25 defines a scheme for discovering and connecting devices and providing information to a user, and provides privacy.

As illustrated in (b) of FIG. 4, the Bluetooth LE protocol stack includes a controller stack 30 operable to process a wireless device interface whose timing is important, and a host stack 40 operable to process high level data.

First, the controller stack 30 may be implemented using a communication module that may include a Bluetooth wireless device, for example, a processor module that may include a processing device, such as a microprocessor.

The host stack may be implemented as part of an OS that operates on a processor module or may be implemented as the instantiation of a package on the OS.

In some examples, the controller stack and the host stack may operate or may be executed on the same processing device within a processor module.

The controller stack 30 includes a physical layer (PHY) 32, a link layer (LL) 34, and a host controller interface (HCI) 36.

The physical layer (PHY) (wireless transceiver module) 32 is a layer for transmitting and receiving a 2.4 GHz wireless signal, and uses Gaussian frequency shift keying (GFSK) modulation and a frequency hopping technique including 40 RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43, a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position using the L2CAP.

First, the L2CAP 41 may provide a single two-way channel for transmitting data to a specific protocol or profile.

The L2CAP 41 may operate to multiplex data between higher layer protocols, segment and reassemble packages, and to manage the transmission of multicast data.

Three fixed channels (one for a signaling channel (CH), one for a security manager, and one for an attribute protocol) are used in BLE.

Meanwhile, the basic rate/enhanced data rate (BR/EDR) uses a dynamic channel and supports a protocol service multiplexer, retransmission, streaming mode, and the like.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: a request message is a message for a client device to request specific information from a server device, and a response message, as a response message with respect to the request message, refers to a message transmitted from the server device to the client device.

② Command message: a message transmitted from the client device to the server device in order to indicate a command of a specific operation. The server device does not transmit a response with respect to the command message to the client device.

③ Notification message: a message transmitted from the server device to the client device in order to provide notification of an event or the like. The client device does not transmit a confirmation message with respect to the notification message to the server device.

④ Indication and confirmation message: a message transmitted from the server device to the client device in order to provide notification of an event or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server using a universal unique identifier (UUID).

The generic access profile (GAP) 45, a layer newly implemented for the Bluetooth LE technology, is used to select a role for communication between Bluetooth LED devices and to control how a multi-profile operation takes place.

Furthermore, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data
② Include: It defines a relationship between services
③ Characteristics: It is a data value used in a server
④ Behavior: It is a format that may be read by a computer defined by a UUID (value type).

The LE profile 46, profiles dependent upon GATT, is mainly applied to a BLE device. The LE profile 46 may include, for example, Battery, Time, FindMe, Proximity, Time, Object Delivery Service, and the like, and details of GATT-based Profiles are as follows.

① Battery: Battery information exchanging method
② Time: Time information exchanging method
③ FindMe: Provision of alarm service according to distance
④ Proximity: Battery information exchanging method
Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

In this case, the advertising device refers to a device that transmits an advertising event, that is, a device that performs an advertisement, and it is also called an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request Advertising Procedure The advertising device performs an advertizing procedure to perform undirected broadcast to devices within a region.

In this case, omni-directional broadcast refers to broadcast in all (every) directions, rather than broadcast in a specific direction.

In contrast, directional broadcast refers to broadcast in a specific direction. Omni-directional broadcast is generated between an advertising device and a device in the listening state (hereinafter, referred to as a "listening device").

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisings (or advertising events) are broadcast through an advertising physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertising device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

In order to request additional user data from the advertising device, the scanning device transmits a scan request to the advertising device. The advertising device transmits a scan response, including additional user data requested by the scanning device, through an advertising physical channel in response to the scan request.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode Discovering Procedure Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier Scanning State The LL enters the scanning state according to an instruction from the host (stack). In the scanning state, the LL listens to advertising channel indices.

The scanning state includes two types: passive scanning and active scanning. Each of the scanning types is determined by the host.

A separate time or advertising channel index for performing scanning is not defined.

In the scanning state, the LL listens to an advertising channel index for scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device Initiating State The LL enters the initiating state according to an instruction from the host (stack).

When the LL is in the initiating state, the LL performs listening on advertising channel indices.

During the initiating state, the LL listens to an advertising channel index during the scan window interval Connection State When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in a Bluetooth interface will be briefly described. BLE devices use packets defined as follows Packet Format The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |

TABLE 1-continued

| PDU Type | Packet Name |
| --- | --- |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state Scanning PDU The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
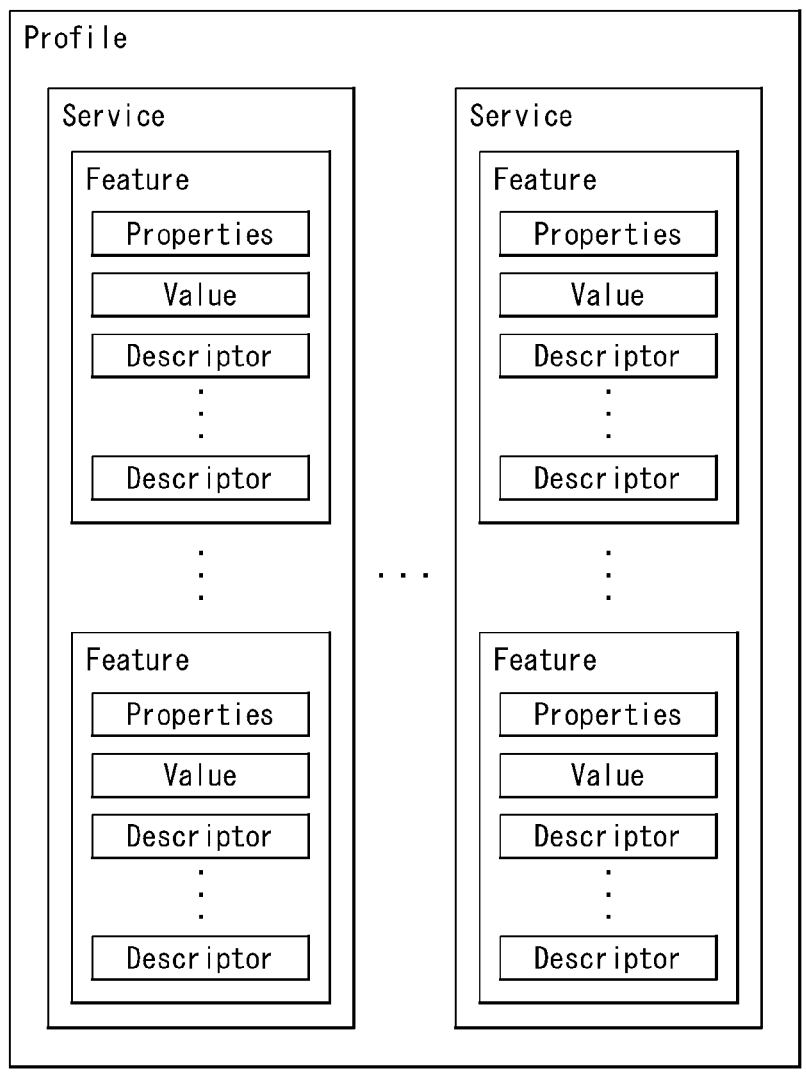
FIG. 5 is a diagram showing an example of the structure of a profile based on the generic attribute profile (GATT) of Bluetooth LE.

FIG. 5 is a diagram showing an example of the structure of a profile based on the generic attribute profile (GATT) of Bluetooth LE.

Referring to FIG. 5, a structure for exchanging profile data of BLE may be examined.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service functions to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each piece of information, an attribute may be required for each piece of information. The characteristic may use several continuous attributes.

The attribute has four components and has meanings as follows.

handle: Address of attribute
Type: Type of attribute
Value: Value of attribute
Permission: Right to access attribute In Bluetooth LE, however, link quality is variable in view of the characteristic of wireless transmission, and thus a shadow area exceeding a radio propagation distance may be generated in view of a one-to-one connection. Accordingly, in order to solve such problems, in Bluetooth, devices on which Bluetooth has been mounted may form a mesh network as a scheme for control through a hop connection between several devices.

The mesh network is described below.

Figure 6:
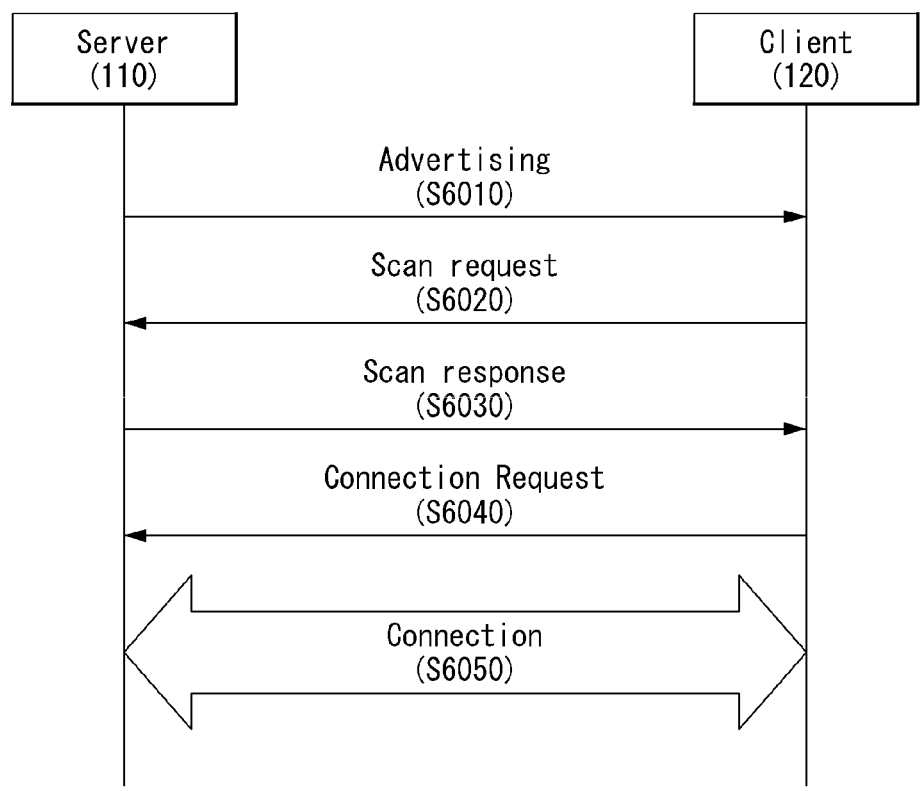
FIG. 6 is a flowchart illustrating an example of a method of establishing a connection using Bluetooth low energy (LE) between devices.

FIG. 6 is a flowchart illustrating an example of a method of establishing a connection using Bluetooth low energy (LE) between devices.

As shown in FIG. 6, for a Bluetooth LE connection between the server device 110 and the client device 120, the server device 110 transmits an advertising message to the client device 120 (S6010).

The advertising message, as described above, is used to provide its own information to another device using Bluetooth LE, and may include various types of information, such as service information provided by a device and user information.

After checking information included in the advertising message transmitted by the server device 110, the client device 120 may transmit a scan request message to the server device if additional information about the server device is necessary (S6020).

When the server device 110 receives the scan request message from the client, it transmits a scan response message, including the requested additional information, to the client device 120 (S6030).

Step S6020 and step S6030 are optional steps and are not essential steps.

If the server device 110 is a device to be connected based on the advertising message and/or the information included in the scan response message transmitted by the server device, the client device 120 transmits a connection request message for a connection to the server device 110 (S6040).

Thereafter, the server device 110 and the client device 120 form a Bluetooth low energy (LE) connection (S6030).

Bluetooth devices can form a Bluetooth LE connection through such a procedure.

Figure 7:
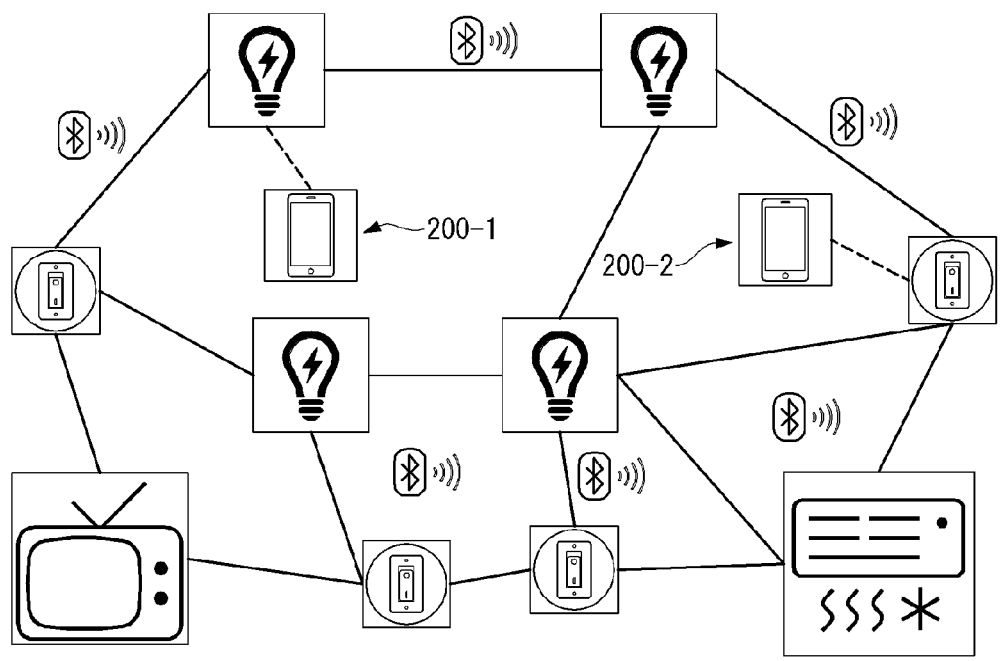
FIG. 7 is a schematic diagram showing an example of a Bluetooth mesh network to which the present invention may be applied.

FIG. 7 is a schematic diagram showing an example of a Bluetooth mesh network to which the present invention may be applied.

As shown in FIG. 7, the mesh network refers to a network in which a plurality of devices is connected like a network through Bluetooth and can transmit and receive data.

In the Bluetooth mesh network technology, one or more devices for intermediating (or relaying) a message are present between a source device 200-1 transmitting data and a destination device 200-2 receiving data.

In this case, the source device and the destination device may be called edge nodes 200-1 and 200-2, and the one or more devices relaying a message may be called relay nodes that relay a message.

Alternatively, the source device and the destination device may include mobile devices 200-1 and 200-2, such as mobile terminals whose locations can be easily changed because they have mobility, and stationary devices, such as TV, a bulb and a switch fixed in the state in which they have been initially installed because they have small mobility or do not have mobility.

Each relay node includes the message cache of a message that has recently received. If the received message is already present in the message cache, the message is not relayed.

However, if the received message is not present in the message cache, the message is relayed and the message is stored in the message cache.

In general, an edge node is supplied with power through the battery. The edge node is present in a sleep state at normal times and may wake up through mutual actions or periodically.

If the following conditions are satisfied, an edge node may process a received message.
 The message is not present in a message cache.
 The message is authenticated by a known network key.
 When the destination of the message is the unicast address of the edge node or a broadcast address or group address is an address to which the edge node belongs.

In general, a relay node is a device supplied with main power, always wakes up, and may transmit received data for other nodes.

A relay node may retransmit a received message to another node if the following conditions are satisfied.
 The message is not present in a message cache.
 The message is authenticated by a known network key.
 If a field (e.g., a relay number value) indicating whether or not to relay the message is a value that permits relay.
 If a destination address is not a unicast address allocated to the relay node.

In a Bluetooth mesh network, a flooding method and a routing method may be divided depending on a data transmission method of relay nodes 200-3 and 200-4.

The flooding method refers to a method for relay nodes that receive a message to shoot the message in the air again using a characteristic in which radio waves are spread everywhere.

That is, the flooding method refers to a method in which the source device 200-1 transmits a message to the relay nodes 200-3 and 200-4 through broadcasting channels and relay nodes receiving the message transmit the message to the destination device 200-2 by transmitting the message to adjacent relay nodes.

In the flooding method, a broadcasting channel is used for the reception and retransmission of a message and the transmission range of a message can be extended.

A mesh network of the flooding method is a dynamic network. In the mesh network of the flooding method, a device is capable of receiving a message and transmitting (or retransmitting) the message if the density of the device is satisfied at any time.

The flooding method has an advantage in that it can be easily implemented, but may have an extensibility problem as a network is extended because messages are transmitted without directivity.

That is, in the mesh network of the flooding method, when a device transmits a message, a plurality of devices receives the message and transmits the received message to a plurality of other devices.

In order to prevent the extensibility problem, the number of devices forming a mesh network may be adjusted to be 100 to 1000, and an accurate number of devices may be determined by several factors.

For example, an accurate number of devices may be determined by a network capacity, a traffic load of data sources, latency of a network and reliability requirements.

Furthermore, the flooding method can easily transfer a message without a cost for constructing a routing table unlike the routing method, but has a disadvantage in that it increases network traffic due to a characteristic in which all of the relay devices 200-3 and 200-4 that have received a message retransmit the received message.

In the routing method, the source device 200-1 transmits a message to a specific relay node. The specific relay node that has received the message transmits the message using information of another relay node or the destination node 200-2 to which the message will be retransmitted.

In the routing method, broadcasting channel or point-to-point connection method is used for the reception and retransmission of a message.

Furthermore, in the routing method, a routing device that has received a message determines the best routing route(s) through which the message is to be transmitted to a middle device or destination device, and determines that the message will be transmitted through which route based on the determined routing table.

The routing method has an advantage of good extensibility, but has disadvantages in that complexity is increased as messages increase because each node has to maintain a routing table and to transmit a message, a lot of memory is required, the routing method is less dynamic than the flooding method, and it is more difficult to implement the routing method than the flooding method.

Furthermore, if the routing table is frequently updated, there are disadvantages in that network performance is deteriorated and battery consumption is great because routing information request and response messages for scanning that a message will be transmitted through which nodes and that which route is the best route are frequently transmitted to surrounding devices through the flooding method.

For example, in FIG. 7, if the location of a device having mobility (hereinafter referred to as a mobile device 200-1, 200-2) continues to be changed, a routing table must continue to be updated whenever the location is changed.

Accordingly, there are problems in that the energy consumption of each node is increased and a collision may occur between messages because a message including routing information must be frequently transmitted to surrounding devices through the flooding method.

In order to solve such problems, the present invention proposes a method of classifying devices into the role of a device having mobility and the role of a device not having mobility and setting the roles of the devices.

Figure 8:
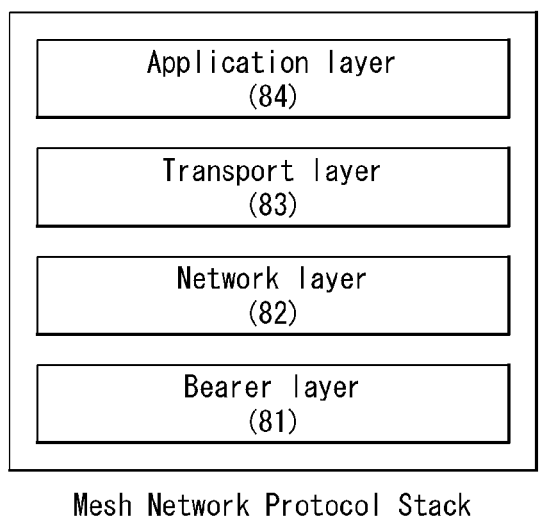
FIG. 8 is a diagram showing an example of the protocol stack of a Bluetooth mesh network to which the present invention may be applied.

FIG. 8 is a diagram showing an example of the protocol stack of a Bluetooth mesh network to which the present invention may be applied.

Referring to FIG. 8, the protocol stack of the mesh network includes a bearer layer 81, a network layer 82, a transport layer 83 and an application layer 84.

The bearer layer 81 defines a method in which a message is transmitted between nodes. That is, in a mesh network, the bearer layer determines a bearer to which a message is transmitted.

A mesh network includes an advertising bearer and a GATT bearer for message transmission.

The network layer 82 defines a method of a message being transmitted to one or more nodes in a mesh network and the formats of network messages transmitted by the bearer layer 81.

Furthermore, the network layer 82 defines whether a message will be relayed or forwarded and a method of authenticating and encrypting network messages.

The transport layer 83 defines the encryption and authentication of application data by providing the confidentiality of an application message.

The application layer 84 defines a method and application Opcode and parameters relating how a higher layer application uses the transport layer 83.

Figure 9:
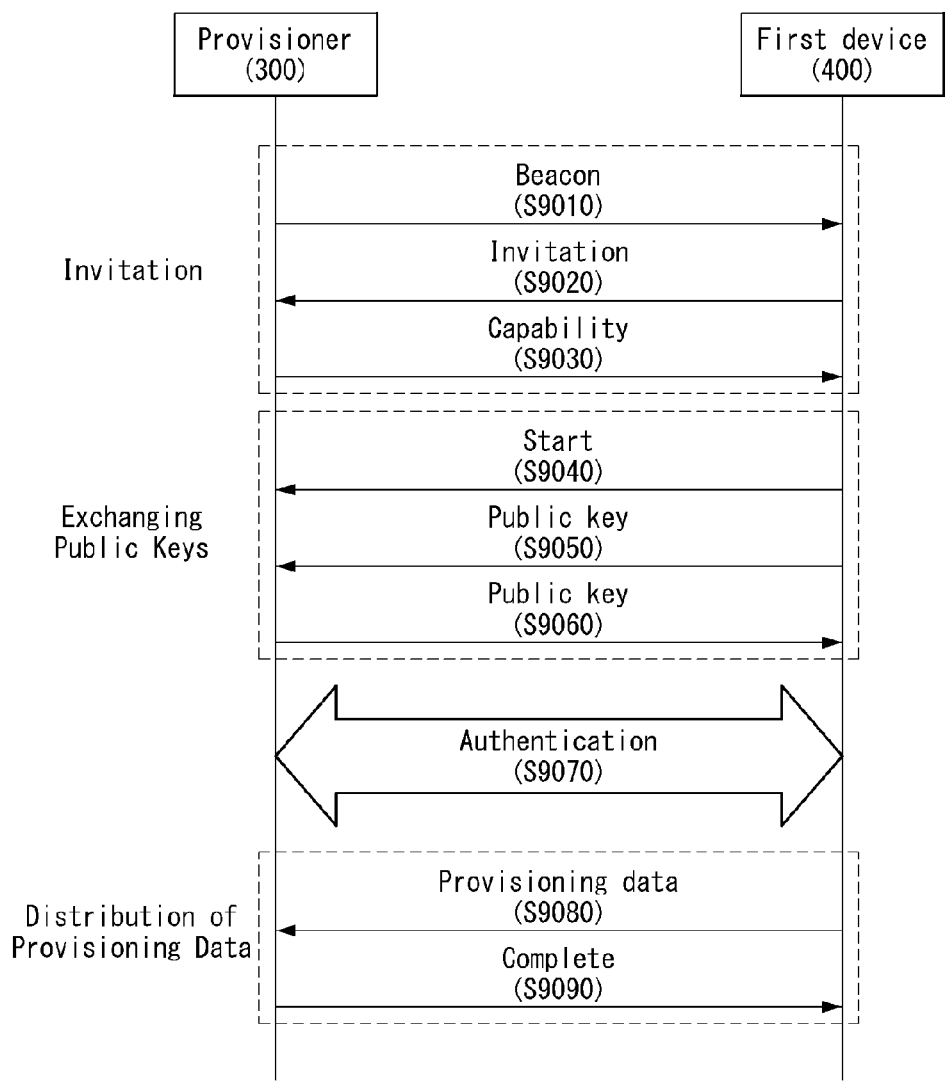
FIG. 9 is a flowchart illustrating an example of a method for a device to join a Bluetooth mesh network to which the present invention may be applied.

FIG. 9 is a flowchart illustrating an example of a method for a device to join a Bluetooth mesh network to which the present invention may be applied.

In order for a new device or a device that has not been provisioned to join a mesh network, the device must experience a provisioning procedure.

The provisioning procedure means a procedure for authenticating a non-authenticated device and providing basic information (e.g., a unicast address and various keys) for joining the mesh network.

That is, the provisioning procedure is a procedure of providing information so that a provisioner (a first device 300) in a mesh network joins the mesh network. The first device 300 may obtain the address of a network, keys, a device identifier and various types of information on which the first device operates as part of a mesh network through the provisioning procedure.

The provisioning procedure includes an invitation step, an exchanging public key step, an authentication step and a distribution-of-provisioning data step.

The provisioning procedure may be performed through various types of bearers. For example, the provisioning procedure may be performed by an advertising-based bearer, a mesh provisioning service-based bearer or a mesh-based bearer.

The advertising-based bearer is an essentially established bearer. The provisioning service-based bearer or the mesh-based bearer may be used for a provisioning procedure if the advertising-based bearer does not support the advertising-based bearer or provisioning data cannot be transmitted through the advertising-based bearer.

The provisioning service-based bearer means a bearer with which provisioning data is exchanged through the GATT Protocol of existing Bluetooth LE. The mesh-based bearer means a bearer with which provisioning data can be exchanged over a mesh network if the first device 300 and the second device 400 are not located in the distance where data can be directly exchanged.

A procedure of establishing the advertising-based bearer is described later.

After the bearer is established between the first device 300 and the second device 400, the first device 300 may be provisioned through the following provisioning procedure.

Invitation Step

The invitation step is started as the second device 400 scans the first device 300. The first device transmits a beacon message to the second device 400 (S9010). The beacon message includes the UUID of the first device 300.

The second device 400 that has scanned the first device 300 through the beacon message transmits an invite message to the first device 300 (S9020).

The invite message asks the first device 300 whether it performs a provisioning procedure. If the first device 300 does not want to perform the provisioning procedure, it neglects the invite message.

If the first device 300 wants to perform the provisioning procedure, however, that is, if the first device attempts to join a mesh network, the first device 300 transmits a capability message in response to the invite message (S9030).

The capability message may include information indicating whether the first device 300 supports the setting of a security algorithm, a public key, information indicating whether a value can be output to a user, and information indicating whether a value can be received from a user.

Exchanging Public Key Step

Thereafter, the second device 400 transmits a start message for a provisioning start to the first device 300 (S9040).

If a public key cannot be used using the out-of-band technology, the second device 400 and the first device 300 exchange public keys (S9050, S9060).

However, if a public key can be used using the out-of-band mechanism, the second device 400 may transmit an ephemeral public key to the first device 300 and read a static public key from the first device 300 using the out-of-band technology.

Thereafter, the second device 400 authenticates the first device 300 by performing an authentication procedure along with the first device 300 (S9070).

Distribution-of-Provisioning Data Step

When the first device 300 is authenticated, the second device 400 and the first device 300 calculate and generate a session key.

Thereafter, the second device 400 transmits provisioning data to the first device 300 (S9080).

The provisioning data may include an application key, a device key, a network key, IVindex, a unicast address, and so on.

The first device 300 that has received the provisioning data transmits a complete message in response to the provisioning data, and thus the provisioning procedure is terminated (S9090).

Figure 10:
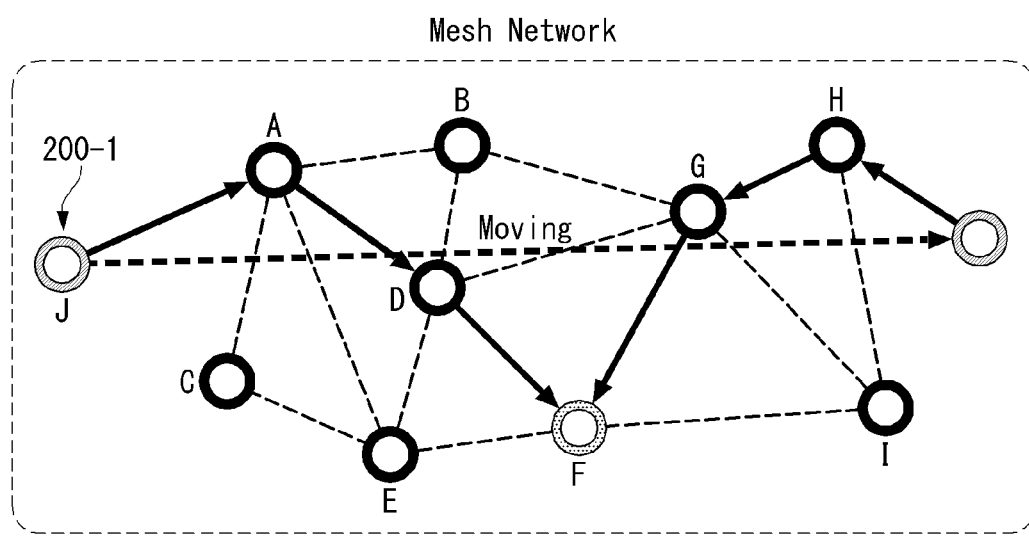
FIG. 10 is a diagram showing an example of a method of updating a routing table in a Bluetooth mesh network to which the present invention may be applied.

FIG. 10 is a diagram showing an example of a method of updating a routing table in a Bluetooth mesh network to which the present invention may be applied.

Referring to FIG. 10, devices not having mobility maintain routing tables by exchanging routing information and transmit messages based on the routing tables. However, a device having mobility does not relay a message and first transmits data or becomes the destination of a message.

In a mesh network, the type of device may include a stationary type in which a change of the location is not frequently generated because mobility is not present as in A to I of FIG. 10, a mobile type in which a location change is frequently generated because mobility is great as in J 200-1 of FIG. 10, and an energy efficient type in which energy efficiency is important.

Table 2 below is a table showing examples of roles according to respective device types and device types.

TABLE 2

| Type | Stationary | Mobil, Energy Efficient |
|---|---|---|
| Role | Router (relay node and/or end node) | Leaf (end node) |
| Type of device | TV, bulb, switch, air-conditioner, etc. | Mobile: mobile communication terminal, tablet, laptop, watch, etc. Energy efficient: sensor, door bell, alarm, etc. |

TABLE 2-continued

| Type | Stationary | Mobil, Energy Efficient |
|---|---|---|
| Routing information update | Update of routing information is not frequently generated | When device moves, routing information is updated |
| Routing information | Routing information can be maintained in device | Only device information of fixed stationary type is known |

Referring to Table 2, a device of a stationary type can play the role of a router.

The router role is to perform a relay node function and may also include the role of an end node, if necessary.

In this case, if a device performs the relay node function, the device may retain a routing table, may receive a message from surrounding other nodes, and may transfer the received message to adjacent devices again. If a device performs the end node function, it generates data and may become the destination of data.

However, if a device performs the end node function, the device cannot relay data received from other devices.

When forming a Bluetooth mesh network, the devices of the stationary type may exchange routing information, may configure routing tables based on the exchanged information, and may transfer a message based on the configured routing table.

Furthermore, there is a poor possibility that routing information of a corresponding node will be changed because mobility is not present or small. If devices of the stationary device type are added or deleted, the routing information may be changed.

Table 3 is a table showing an example of routing information of the A.

TABLE 3

| Destination | Next Hop |
|---|---|
| F | D |
| G | B, D |
| H | B, D |
| I | B, D |
| ... | ... |

Table 4 is a table showing an example of routing information of the H.

TABLE 4

| Destination | Next Hop |
|---|---|
| A | G |
| B | G |
| C | G, I |
| D | G |
| E | G, I |
| F | G |
| ... | ... |

However, a device of a mobile type may be a device to which power is constantly supplied because it has to update and maintain a routing table depending on a movement of the device of a mobile type and it has to frequently receive data traffic from other nodes.

Devices of the mobile type and energy efficient type may play the role of a leaf in a mesh network.

The leaf role may perform an end node function.

However, devices of the energy efficient type cannot perform a relay function for receiving data from other nodes and transferring the data because they operate in a sleep mode in which energy consumption can be periodically minimized in order to reduce energy consumption.

Furthermore, the location of a device of the mobile type is frequently changed. Accordingly, if the device performs a relay function, routing information of surrounding nodes may be frequently changed and thus the device of the mobile type cannot perform a relay function.

As described above, devices of the mobile and energy efficient type are made to perform only the end node function. Although the location of the device is changed, routing information is not changed. Accordingly, the stability of a connection in a mesh network can be secured.

When a device playing the role of a leaf node is connected to a mesh network, it may exchange messages with devices that play the role of a router.

Furthermore, a device playing the role of a leaf node may search for a device of the router role that performs a relay function whenever the location of the device is changed, may connect to the retrieved device, and may exchange messages with the retrieved device.

Figure 11:
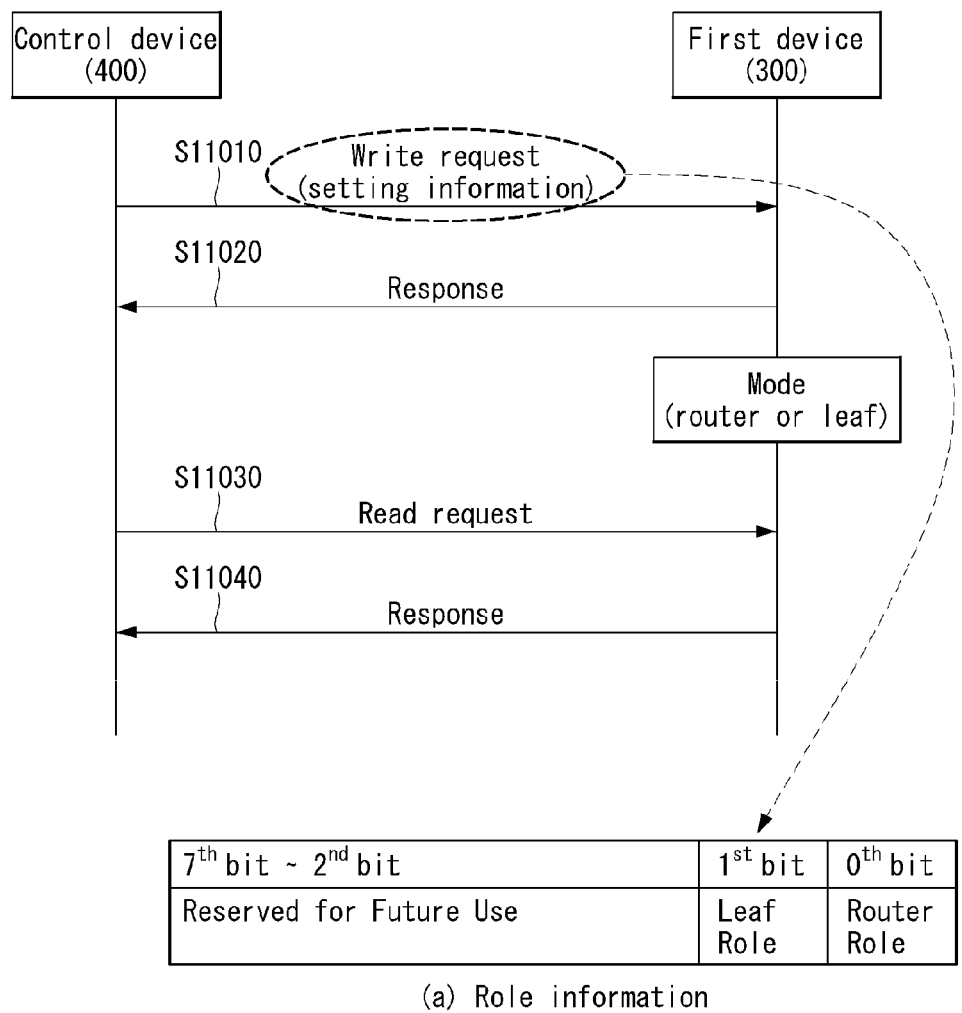
FIG. 11 is a flowchart illustrating an example of a method for setting the role of a device in a Bluetooth mesh network to which the present invention may be applied.

FIG. 11 is a flowchart illustrating an example of a method for setting the role of a device in a Bluetooth mesh network to which the present invention may be applied.

Referring to FIG. 11, a control device may set the roles of devices described in FIG. 10, and may be aware of the operating state of each device, that is, a currently set role.

Specifically, after the control device 400 and the first device 300 form a Bluetooth LE connection through the connection procedure described with reference to FIG. 6, the control device 400 may set the role of the first device 300 by transmitting a write request message to the first device 300 (S11010).

The control device 400 may set the role of the first device 300 by requesting the writing of characteristics related to the role of a device included in the GATT Data base of the first device 300 through the write request message.

In this case, the write request message may include setting information indicative of a role to be set, and the setting information may have a data format, such as that of FIG. 11(a).

The control device 400 sets the bit of the role to be set to '1' and transmits the setting information to the first device 300. The first device 300 may perform a role corresponding to the bit set to '1'.

In this case, the control device 400 may receive information related to the first device 300 from the first device 300 before it sets the role, and may set the role based on the received information.

For example, if the first device 300 is the mobile type having a lot of mobility or the energy efficient type in which energy efficiency is important, the first device may not be set as a router role.

The first device 300 that has received the write request message transmits a corresponding response message to the control device 400 (S11020), and may change (or set) its device mode (or role) as a router or leaf based on the write request message.

The first device 300 whose device mode has been changed may transmit role information indicative of the changed or set role to other surrounding devices through a transmission advertising message.

In order to check the role or operating state of the first device 300, the control device 400 may transmit a read request message to the first device 300 (S11030).

The first device 300 that has received the read request message may include information of characteristics related to the role included in the GATT Data base of the first device 300 in a response message, and may transmit the response message to the control device 400 (S11040).

The control device 400 that has received the response message may check that the first device 300 has been set as which role and the current operating state of the first device 300.

As described above, the role of the first device 300 in a Bluetooth mesh network may be set based on information of the first device 300, and the current role and operating state of the first device can be aware.

In another embodiment of the present invention, the control device may set the role of a relay node for relaying data in the aforementioned flooding method.

Specifically, the control device may control the first device 300 so that the first device 300 plays or does not play the role of a relay by transmitting a control message to the first device 300.

That is, the control device may make on/off the relay function of the first device 300 by transmitting the control message.

In this case, the control message may be transmitted in an advertising message form if a Bluetooth LE connection with the first device 300 has not been established. If the Bluetooth LE connection has been established, the control message may be transmitted in a write request message form based on GATT Data base.

Furthermore, the control message may include operation code in order to control the on/off of the relay operation of the first device 300.

Figure 12:
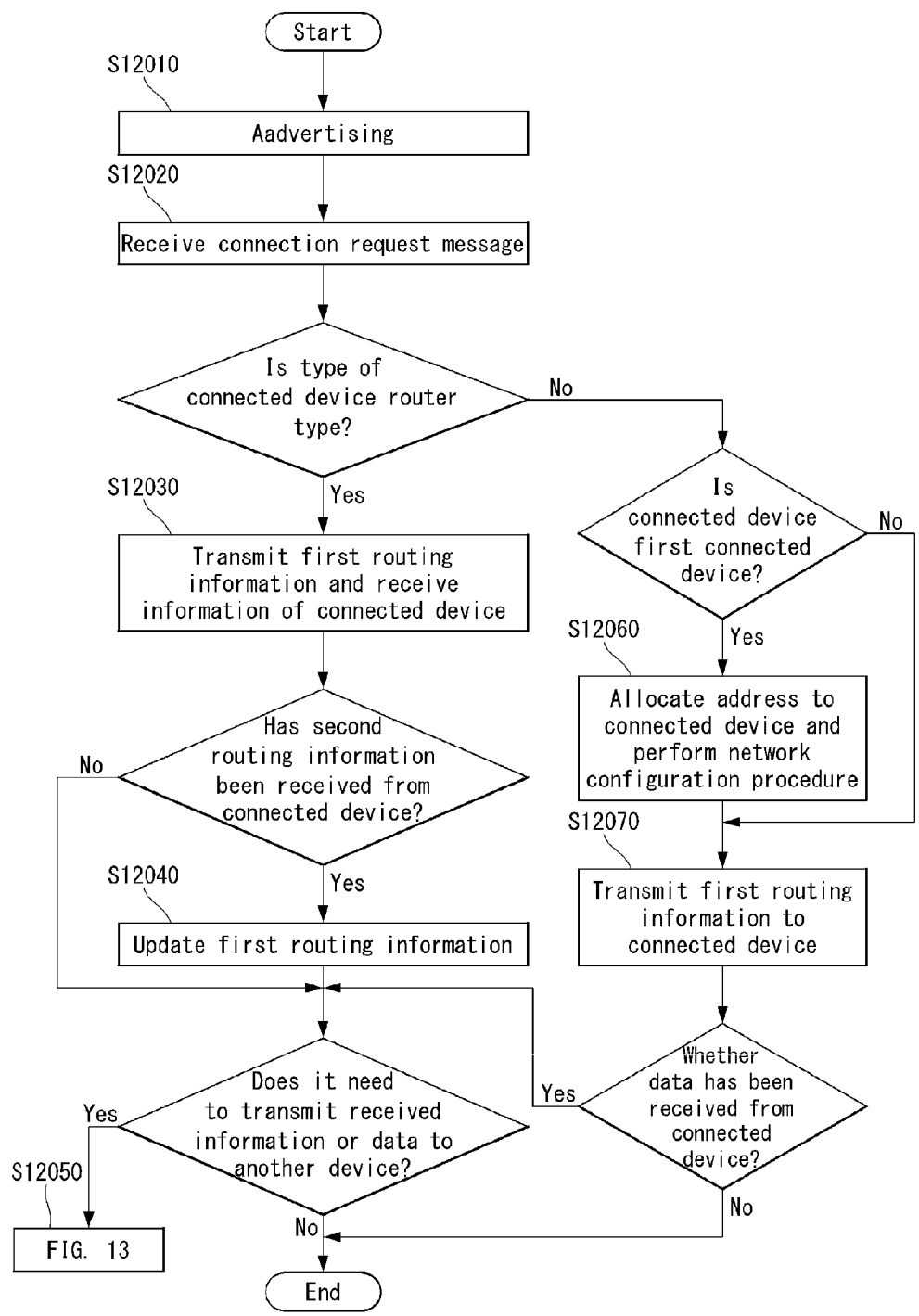
FIGS. 12 and 13 are flowcharts illustrating examples of device operations in a Bluetooth mesh network to which the present invention may be applied.
Figure 13:
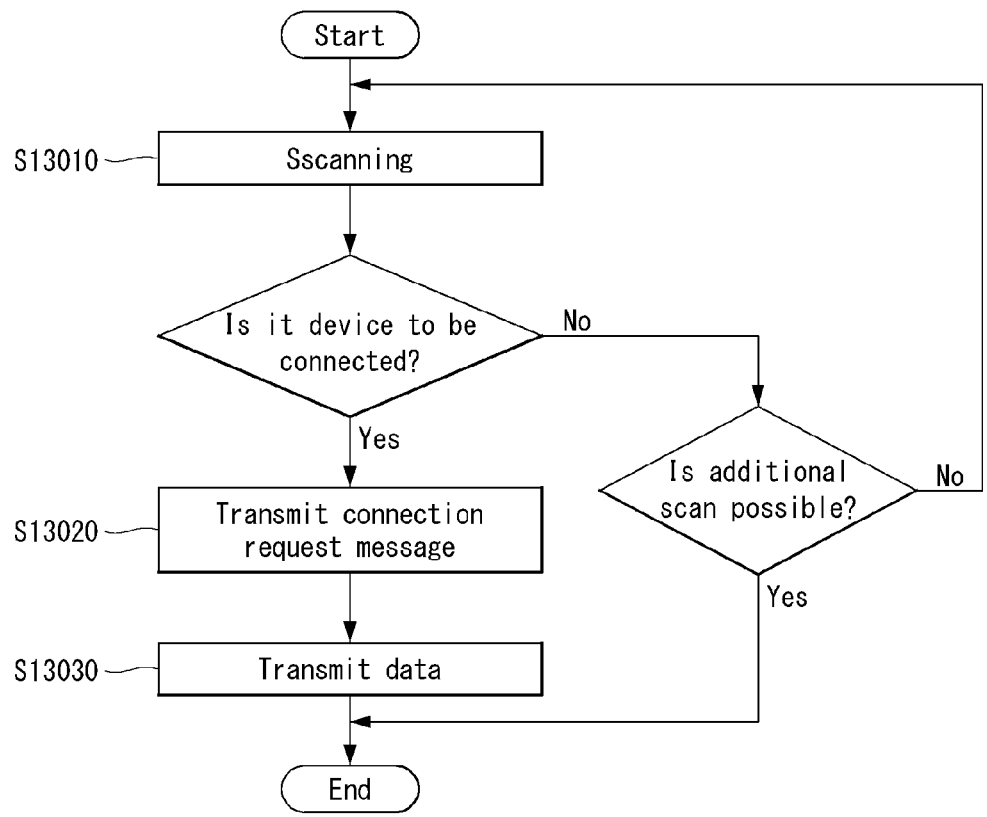

FIGS. 12 and 13 are flowcharts illustrating an example of a device operation in a Bluetooth mesh network to which the present invention may be applied.

Referring to FIGS. 12 and 13, if the role of a device has been set as a router through the method of FIG. 11, the device may be connected to another surrounding device through Bluetooth LE, and may exchange routing information or transmit network information according to the role of the connected device.

Specifically, as described in FIG. 11, the first device 300 set as a router role through the control device may receive an advertising message transmitted by other surrounding devices and scan another device.

Furthermore, the first device 300 may notify other surrounding devices of the presence and role of the first device 300 by transmitting the advertising message (S12010).

Thereafter, the first device may be connected to a surrounding device through Bluetooth LE by receiving a connection request message from the surrounding device or transmitting the connection request message to the surrounding device (S12020).

If the connected device plays the role of a router, the first device 300 may transmit routing information (first routing information) related to its own routing table to the connected device (second device) and receive information related to the connected device (S12030).

If the information related to the connected device includes routing information (the second routing information) related to the routing table of the connected device, the first device 300 may update its own routing table (S12040).

If the first device 400 does not need to transmit the information received from the second device to other surrounding devices, it may transmit the received information to other surrounding devices through the procedure of FIG. 13 (S12050).

Thereafter, the first device 400 may transmit a message, transmitted through routing information related to the updated routing table, to a next node.

If the connected device plays the role of a leaf, the first device 400 determines whether the connected device has been previously connected thereto.

If the connected device has not been connected to the first device 400 before, the first device 400 may perform an environment configuration procedure for a mesh network with the connected device and allocate the address of the mesh network to the connected device.

Furthermore, the first device may receive information related to the connected device from the connected device.

Thereafter, the first device 400 transmits the first routing information to the connected device (S12070). If the connected device transmits a message according to a routing scheme in the mesh network, it may transmit the message based on the first routing information.

If the first device 400 has received the message from the connected device and has to transmit the message to a surrounding device, it may transmit the message through the procedure of FIG. 13 (S12050).

FIG. 13 shows an example of a procedure in which in the procedure of FIG. 12, the first device 400 playing the role of a router transmits information and/or a message received from the connected device to another device of the mesh network.

Specifically, the first device 400 may receive an advertising message from surrounding devices in order to scan a device that transmits the received information and/or message (S13010).

The first device 400 can identify a device that has transmitted the advertising message based on information included in the received advertising message.

The first device 400 determines whether the device that has transmitted the advertising message is a device to be connected. If the device that has transmitted the advertising message is not a device to be connected, the first device may receive an advertising message again and scan surrounding devices (S13010).

If the device that has transmitted the advertising message is a device to be connected, the first device 400 may form a Bluetooth LE connection by transmitting a connection request message to the device (S13020).

Thereafter, the first device may transmit the received information and/or message to the connected device through Bluetooth LE (S13030).

Through the method described with reference to FIGS. 12 and 13, if a connected device plays the role of a router, a device playing the role of a router may update its routing table by exchanging routing information. A leaf node may not update a routing table.

Figure 14:
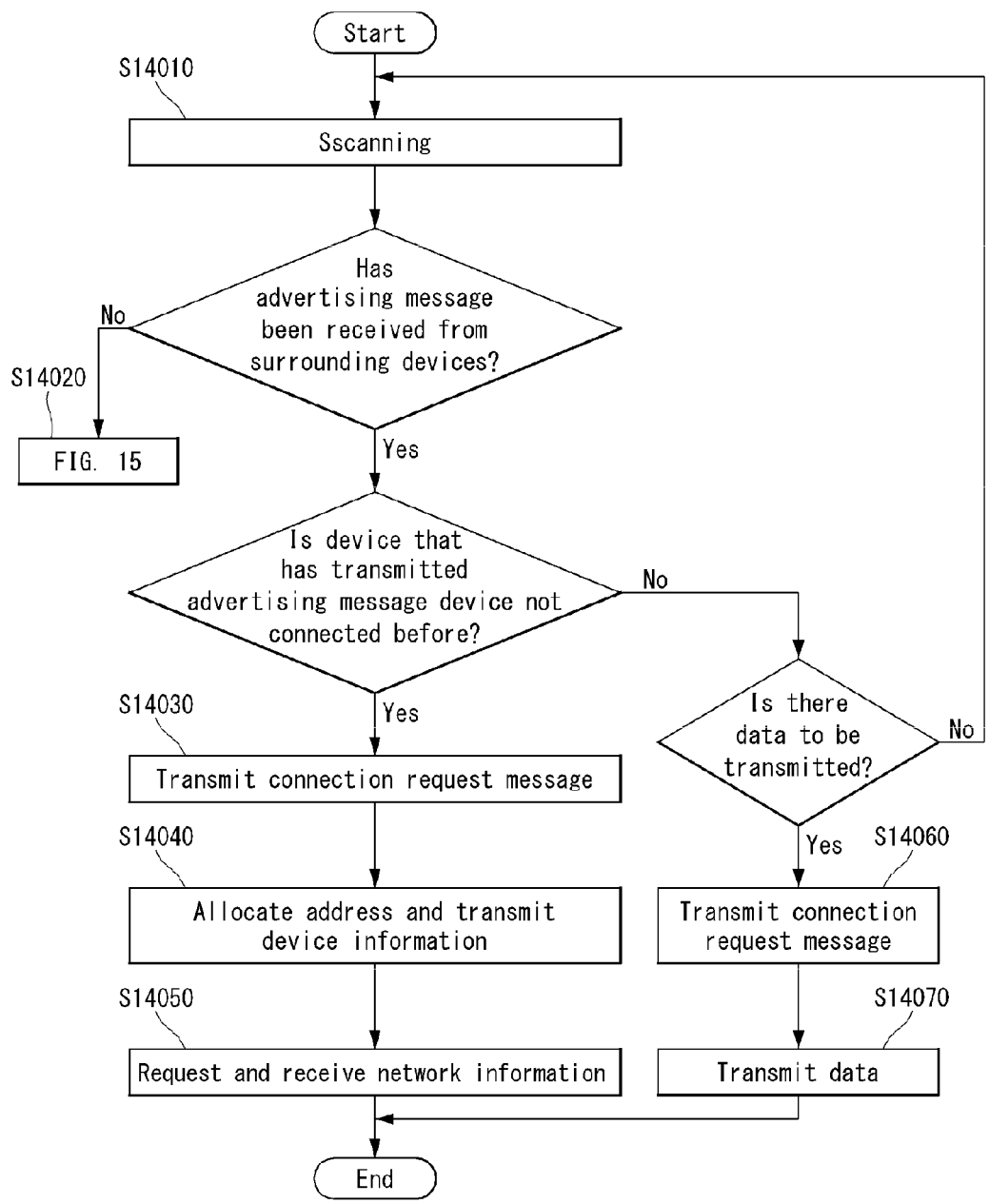
FIGS. 14 and 15 are flowcharts illustrating another example of a device operation in a Bluetooth mesh network to which the present invention may be applied.
Figure 15:
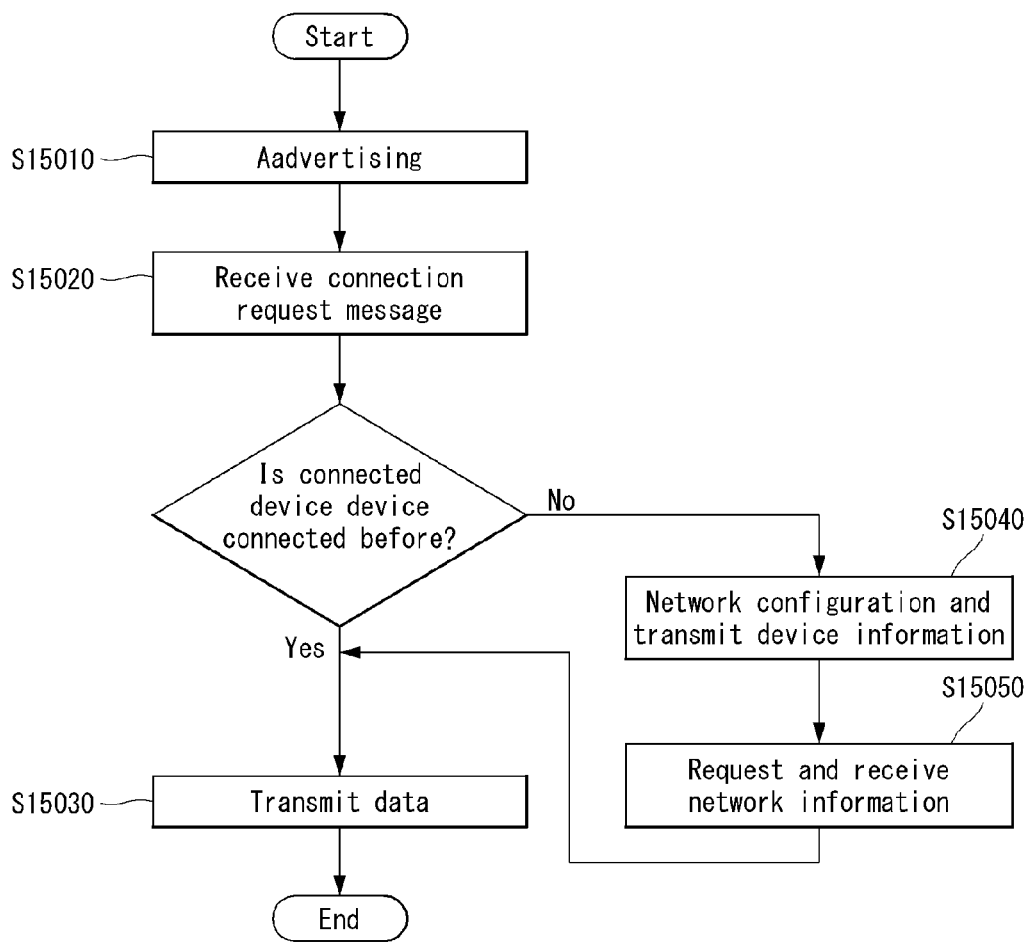

FIGS. 14 and 15 are flowcharts illustrating another example of a device operation in a Bluetooth mesh network to which the present invention may be applied.

Referring to FIGS. 14 and 15, if the role of a device has been set as a leaf through the method of FIG. 11, the device is connected to a surrounding device through Bluetooth LE and may transmit and receive message.

Specifically, when the first device 300 is set to play the role of a leaf through the procedure of FIG. 11, the first device 300 performs scanning in order to search for a surrounding Bluetooth LE device (e.g., a device playing the role of a router role) (S14010).

If, as a result of the scanning, an advertising message for device scanning is received from a surrounding device, the first device 300 determines whether the device (second device) that has transmitted the advertising message is a device that has been connected to the first device 300 before through information included in the advertising message.

If the second device is a device that has been connected to the first device 300 before, the first device 300 may form a Bluetooth LE connection by transmitting a connection request message to the second device if there is a message or data to be transmitted to the second device (S14060).

Thereafter, the first device 300 transmits the message and/or data to the second device.

If a message or data to be transmitted to the second device is not present, however, the first device 300 returns to a scan procedure and may scan another device.

If the second device is a device that has not been connected to the first device 300 before, the first device 300 may form a Bluetooth LE connection by transmitting a connection request message to the second device (S14030), and may perform an environment configuration procedure along with the second device.

The first device 300 may transmit its own information to the second device and receive an address allocated thereto from the second device through the environment configuration procedure (S14040).

Thereafter, the first device 300 may transmit a request message that requests network information (e.g., routing information related to the routing table of the first device or a network ID indicative of a mesh network) to the second device, and may receive a response message, including network information, as a response to the request message (S14050).

If the first device 300 has to transmit a message to a specific device located in a long distance included in a mesh network, it may transmit the message to the second device so that the message is transmitted to the specific device.

Furthermore, the first device 300 may receive a message, transmitted by the specific device, through the second device.

The first device 300 may periodically receive an advertising message transmitted by a device that is included in the mesh network and that plays the role of a router, and may be connected to the device that has transmitted the received advertising message through Bluetooth LE.

If the first device 300 does not receive an advertising message from a device included in the mesh network at step S14010, it may form a Bluetooth LE connection with a device that is included in the mesh network and that plays the role of a router through the procedure described with reference to FIG. 15 (S14020).

Hereinafter, the procedure of FIG. 15 is described in detail.

In FIG. 14, if the first device 300 does not receive an advertising message from a device that is included in the mesh network and that plays the role of a router through the scan procedure, it transmits an advertising message to surrounding devices (S15010).

When the first device 300 receives a connection request message from a device that is included in the mesh network and that plays the role of a router in response to the advertising message, it may form a Bluetooth LE connection with the device (second device) that has transmitted the connection request message through a connection procedure (S15020).

If the second device is a device that has been connected to the first device before, the first device 300 transmits a message and/or data to the second device without a separate environment configuration procedure (S15030).

Furthermore, if the routing information of the second device has been updated compared to previous routing information, the first device may receive the updated routing information from the second device.

If the second device is a device that has not been connected to the first device before, the first device 300 may perform a network environment configuration procedure along with the second device.

The first device 300 may transmit its own information to the second device, and may receive an address allocated thereto from the second device through the environment configuration procedure (S15040).

Thereafter, the first device 300 may transmit a request message that requests network information (e.g., routing information related to the routing table of the first device) to the second device, and may receive a response message, including the network information, in response to the request message (S15050).

If the first device 300 has to transmit a message to a specific device in a long distance which is included in a mesh network, it may transmit the message to the specific device by transmitting it to the second device (S15030).

Furthermore, the first device may receive a message, transmitted by the specific device, via the second device.

The first device 300 may periodically receive an advertising message from a device that is included in the mesh network and that plays the role of a router, and may be connected to the device that has transmitted the received advertising message through Bluetooth LE.

Figure 16:
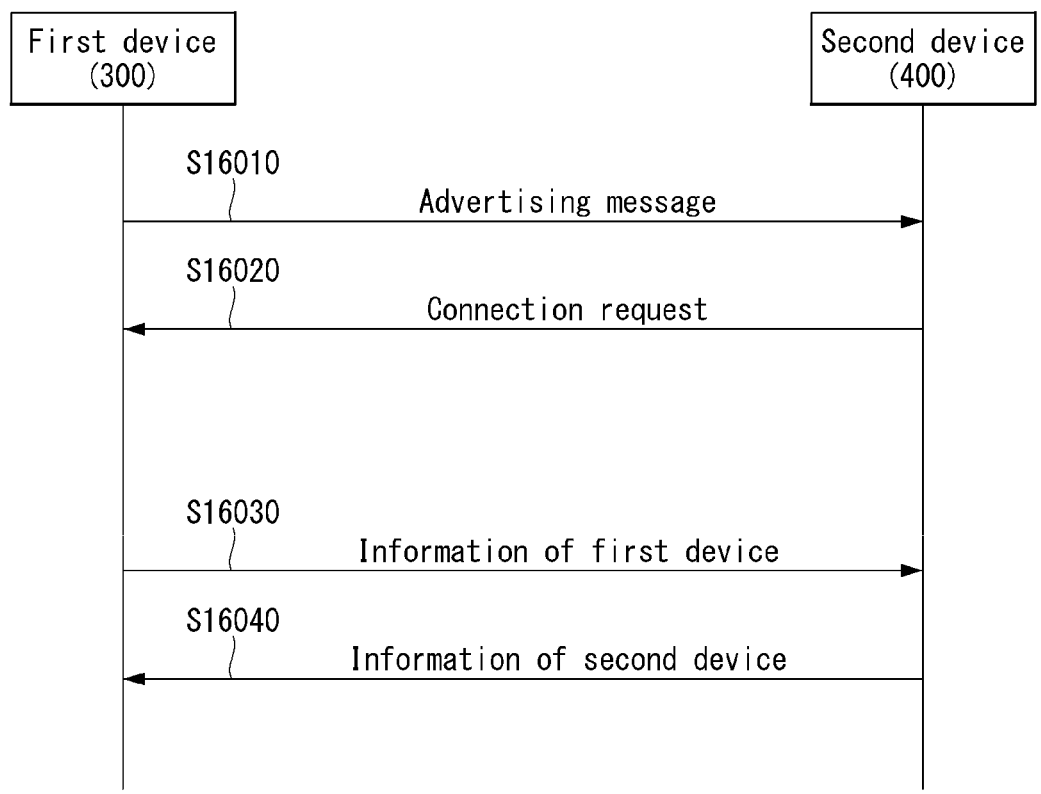
FIG. 16 is a flowchart illustrating an example of the operation of a device after the role of the device is set in a Bluetooth mesh network to which the present invention may be applied.

FIG. 16 is a flowchart illustrating an example of the operation of a device after the role of the device is set in a Bluetooth mesh network to which the present invention may be applied.

Referring to FIG. 16, after the role of the first device is set through the procedure described with reference to FIG. 11, when the first device is connected to another device included in the mesh network, it may exchange device information with another device.

Specifically, after the role of the first device 300 is set by the control device in FIG. 11, it may include role information indicative of the set role in an advertising message and transmit the advertising message to the second device 400 (S16010).

In this case, the second device 400 may play the role of a router or leaf.

If the second device 300 that has received the advertising message wants to connect to the first device 300 through Bluetooth LE, it may transmit a connection request message to the first device (S16020).

Thereafter, the first device 300 and the second device 400 may form a Bluetooth LE connection through an authentication procedure and a security procedure.

If the first device 300 does not want to connect to the second device 400, it may reject a connection request from the second device 400.

The first device 300 that has formed the Bluetooth LE connection with the second device 400 may transmit a first message, including the first information related to the first device, to the second device 400 (S16030), and may receive a second message, including second information related to the second device, from the second device (S16040).

In this case, the first information and the second information are information for the formation of a Bluetooth mesh network and the transmission and reception of data, and may be different depending on the roles of the first device 300 and the second device 400.

For example, the second information may include ID information indicative of the second device 400.

Figure 17:
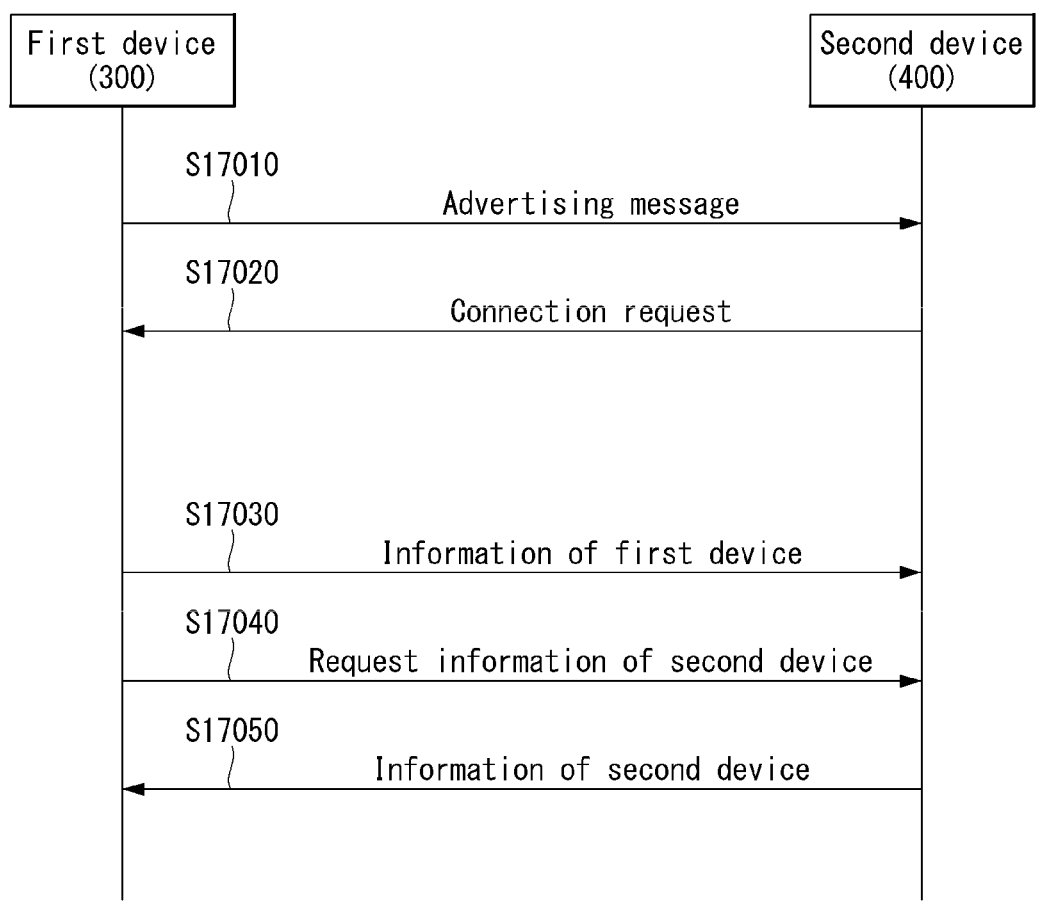
FIG. 17 is a flowchart illustrating another example of the operation of a device after the role of the device is set in a Bluetooth mesh network to which the present invention may be applied.

FIG. 17 is a flowchart illustrating another example of the operation of a device after the role of the device is set in a Bluetooth mesh network to which the present invention may be applied.

Referring to FIG. 17, if the first device 300 and the second device 400 perform routing roles in a Bluetooth mesh network, they may update routing tables by exchanging routing information.

First, step S17010 and step S17020 are the same as step S16010 and step S16020 of FIG. 16 and a description thereof is omitted.

The advertising message transmitted by the first device may include role information indicative of the role of the first device in the Bluetooth mesh network.

Thereafter, the first device 300 and the second device 400 may form a Bluetooth LE connection through an authentication procedure and a security procedure.

If the first device 300 does not want to connect to the second device 400, it may reject a connection request from the second device 400.

The first device 300 that has formed a Bluetooth LE connection with the second device 400 may transmit information of the first device to the second device 400 (S17030).

In this case, the information of the first device may include routing information related to the routing table of the first device.

The first device 300 may transmit a request message to the second device 400 in order to request information of the second device (S17040), and may receive the information of the second device as a response to the request message (S17050).

In this case, the information of the second device may include routing information related to the routing table of the second device.

Thereafter, the first device 300 and the second device 400 may update the routing tables based on the received information, and may transmit messages to devices, included in the Bluetooth mesh network, through the updated routing tables.

Figure 18:
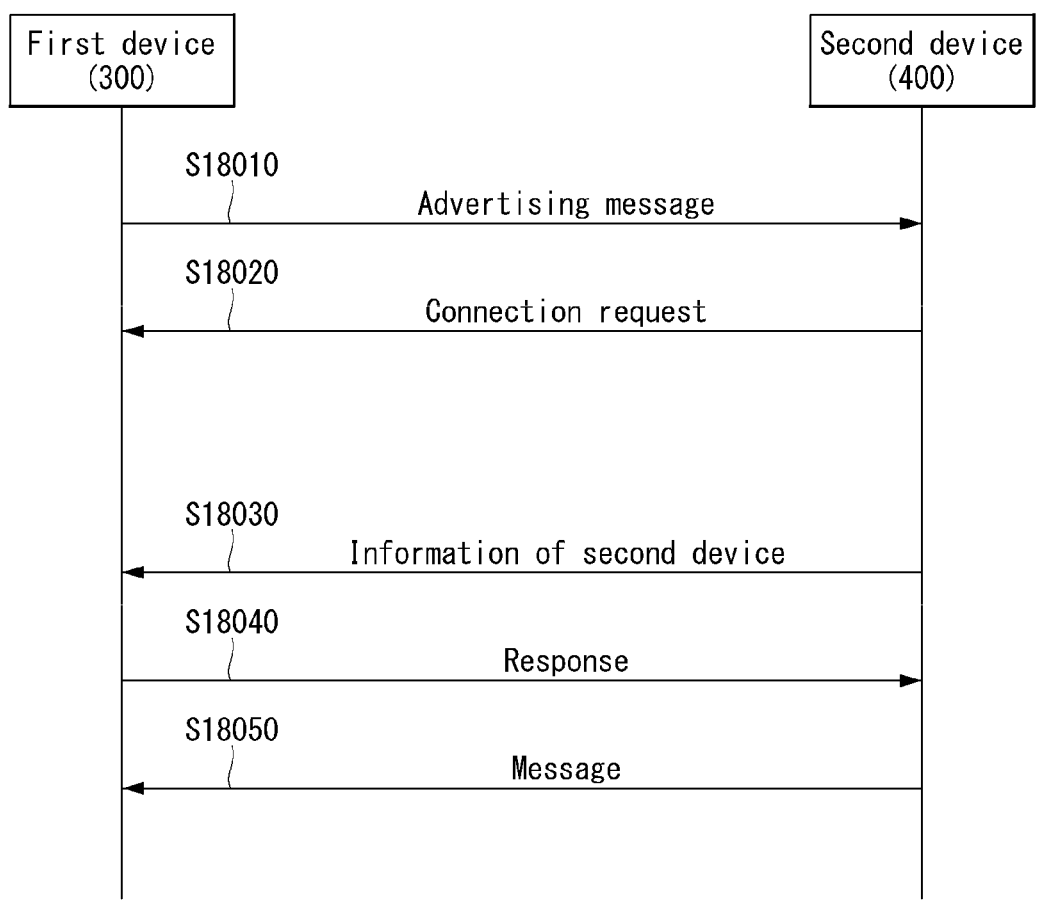
FIG. 18 is a flowchart illustrating yet another example of the operation of a device after the role of the device is set in a Bluetooth mesh network to which the present invention may be applied.

FIG. 18 is a flowchart illustrating yet another example of the operation of a device after the role of the device is set in a Bluetooth mesh network to which the present invention may be applied.

Referring to FIG. 18, if the first device 300 performs a routing role and the second device 400 plays the role of a leaf in a Bluetooth mesh network, the second device 400 may transmit a message to a specific device within the mesh network through a connection with the first device 300.

First, step S18010 and step S18020 are the same as step S16010 and step S16020 of FIG. 16 and a description thereof is omitted.

An advertising message transmitted by the first device may include role information indicative of the role of the first device in the Bluetooth mesh network.

Thereafter, the first device 300 and the second device 400 may form a Bluetooth LE connection through an authentication procedure and a security procedure.

If the first device 300 does not want to connect to the second device 400, it may reject a connection request from the second device 400.

The second device 400 that has formed the Bluetooth LE connection with the first device 300 may transmit information of the second device to the first device 300 (S18030), and may receive a response to the information (S18040).

Thereafter, as described above with reference to FIGS. 14 and 15, the second device 400 may receive an address allocated thereto which will be used in the mesh network from the first device, and may receive routing information related to its routing table for transmitting a message.

Thereafter, if the second device 400 wants to transmit a message to a specific device included in the mesh network, it may transmit the message to the specific device by transmitting the message to the first device 300.

In this case, it is assumed that the specific device is located out of the connection range of the second device through Bluetooth LE.

For example, if the second device 400 wants to transmit a control message to the specific device in order to control the operation of the specific device, the second device 400 transmits the control message to the first device 300.

The first device 300 that has received the control message transmits the control message to a next device for transmitting the control message to the specific device based on the routing table.

The method described with reference to FIG. 18 may be applied to the following situations.

If the second device 400 first joins a mesh network and connects to a device playing the role of a router.

If the second device does not receive an advertising message from a connected device playing the role of a router for a specific time and receives an advertising message from a device playing the role of another router.

If the second device attempts to connect to a surrounding device playing the role of a router because it has a message to be transmitted.

However, the present invention is not limited thereto and may be used for various cases.

Figure 19:
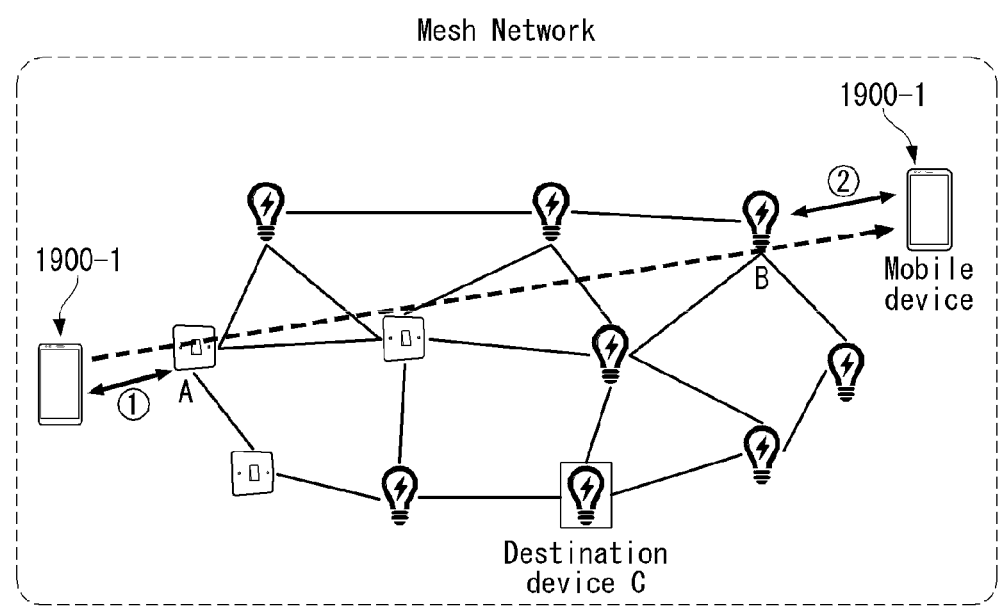
FIG. 19 is a diagram showing an example of a method for transmitting a message in a Bluetooth mesh network to which the present invention may be applied.

FIG. 19 is a diagram showing an example of a method for transmitting a message in a Bluetooth mesh network to which the present invention may be applied.

Referring to FIG. 19, when the device playing the role of a leaf, described with reference to FIG. 10, moves to another location in the mesh network, it may transmit a message to a destination even without a separate update of the routing table.

First, it is assumed that a mobile device 1900-1 having mobility plays the role of a leaf and a bulb and switch not having mobility play the role of routers.

The switch, the bulb and the mobile device form a Bluetooth mesh network.

In this case, ① the mobile device 1900-1 may transmit a control message or controlling a specific operation of the bulb C to the switch A. For example, the mobile device 1900-1 may transmit a control message for turning off power of the bulb C.

The switch A playing the role of a router transmits the control message, received from the mobile device, to an adjacent device performing a relay function by performing a relay operation In this case, the switch A transmits the control message based on a routing table and the mobile device 1800-1 plays the role of a leaf. Accordingly, the routing table of the switch is not updated due to the movement of the mobile device.

The control message is transmitted to the bulb C, that is, a destination, through such a relay operation. The bulb C receives the control message and turns off its power.

In this case, the mobile device 1800-1 may have been connected to the switch A through Bluetooth LE.

② Thereafter, the mobile device may move to another location. However, since the mobile device 1900-1 plays the role of a leaf, the routing table of the switch A is not updated due to the movement of the mobile device 1900-1.

If the mobile device 1900-1 wants to control the bulb C at the moved location, it transmits a control message to the bulb C, that is, a surrounding device playing the role of a router.

For example, the mobile device 1900-1 may transmit a control message for turning off power of the bulb C.

The bulb B playing the role of a router transmits the control message, received from the mobile device, to an adjacent device performing another relay function, by performing a relay operation.

In this case, the bulb B transmits the control message based on the routing table and the mobile device 1900-1 plays the role of a leaf. Accordingly, the routing table of the bulb B is not updated although the mobile device has moved to the location of the bulb B.

The control message is transmitted to the bulb C, that is, the destination, through such a relay operation. The bulb C receives the control message and turns off its power.

In this case, the mobile device 1900-1 may have been connected to the bulb B through Bluetooth LE.

The routing tables of devices having a lot of mobility may not be frequently updated although the locations of the devices are changed because the roles of the devices forming a mesh network are set as described above.

Figure 20:
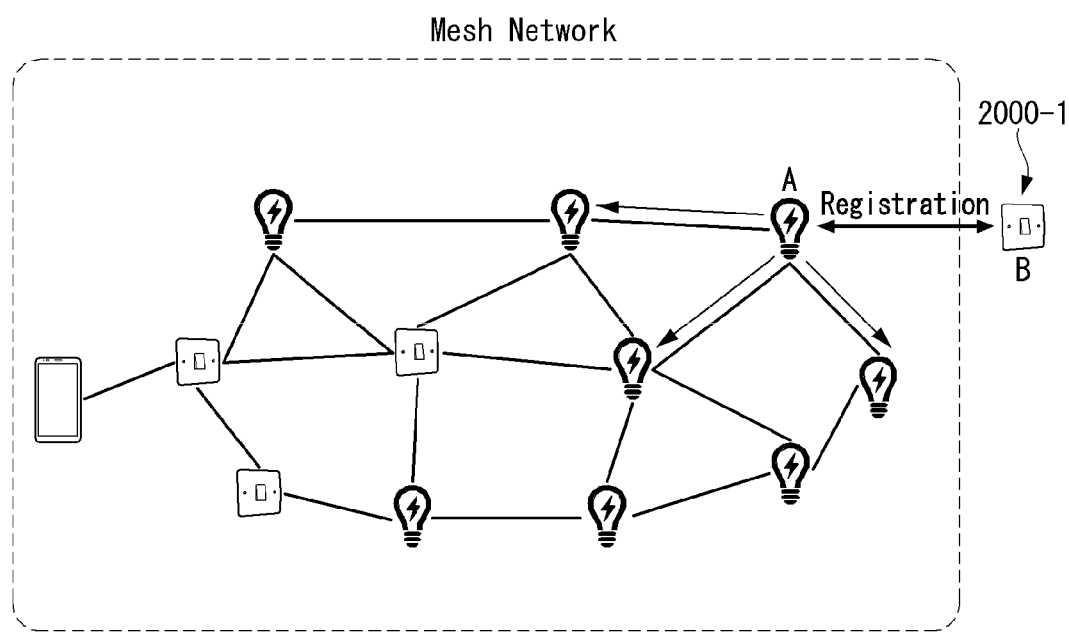
FIG. 20 is a diagram showing another example of a method for transmitting a message in a Bluetooth mesh network to which the present invention may be applied.

FIG. 20 is a diagram showing another example of a method for transmitting a message in a Bluetooth mesh network to which the present invention may be applied.

Referring to FIG. 20, if the device performing the routing role, described with reference to FIG. 10, wants to join the mesh network, it may update its routing table by exchanging routing information with an adjacent device performing another routing role.

First, it is assumed that a mobile device having mobility plays the role of a leaf and a bulb and switch not having mobility play the role of routers.

The switch, the bulb and the mobile device form a Bluetooth mesh network.

In this case, if a device capable of performing a routing role joins the mesh network, for example, if a switch B 2000-1 is installed and joins the mesh network, as described with reference to FIGS. 12, 13 and 17, the switch may exchange routing information and device information with the adjacent bulb A playing the role of a router.

Thereafter, the bulb A may transmit the information and routing information of the switch B 2000-1 to other adjacent devices. The other devices that have received the bulb A and routing information may update their routing tables.

In this case, the information and routing information of the switch B 2000-1 may be transmitted to other adjacent devices through the flooding method.

Thereafter, if a message is transmitted according to the routing scheme in the mesh network, the message may be transmitted based on an updated routing table.

Figure 21:
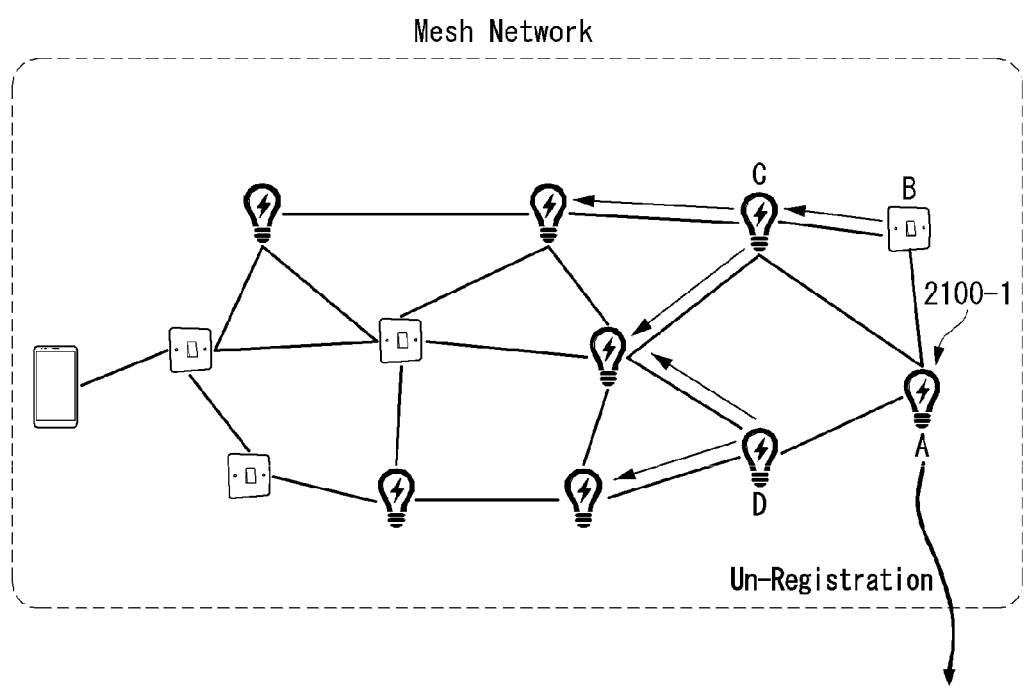
FIG. 21 is a diagram showing yet another example of a method for transmitting a message in a Bluetooth mesh network to which the present invention may be applied.

FIG. 21 is a diagram showing yet another example of a method for transmitting a message in a Bluetooth mesh network to which the present invention may be applied.

Referring to FIG. 21, if the device performing the routing role, described with reference to FIG. 10, is excluded from the mesh network, an adjacent device performing another routing role may update its routing table.

First, it is assumed that a mobile device having mobility plays the role of a leaf and a bulb and switch not having mobility play the role of routers.

The switch, the bulb and the mobile device form a Bluetooth mesh network.

In this case, if the device capable of performing the routing role is excluded from the mesh network, for example, if the bulb A 2100-1 is excluded from the mesh network, the switch B, bulb C and bulb D that are adjacent to the bulb A and that play the role of routers may update their routing tables.

Thereafter, the switch B, the bulb C and the bulb D may transmit updated routing information to other adjacent devices. Other adjacent devices that have received the updated routing information may update their routing tables.

In this case, the switch B, the bulb C and the bulb D may transmit the updated routing information to the adjacent devices according to the flooding method.

Thereafter, if a message is transmitted through the routing scheme in the mesh network, the message may be transmitted based on the updated routing table.

The present invention described above may be substituted, modified and changed by a person having ordinary skill in the art to which the present invention pertains without departing from the technological spirit of the present invention, and thus is not restricted by the aforementioned embodiments and the accompanying drawings.

INDUSTRIAL APPLICABILITY

This specification relates to the transmission and reception of Bluetooth data and, more particularly, to a method and apparatus for transmitting messages between devices in a mesh network using a Bluetooth low energy (LE) technology.

The invention claimed is:

1. A method for setting a role of a first device in a mesh network of Bluetooth, the method being performed by the first device and comprising:
    transmitting type information for determining the role of the first device to a control device,
    wherein the type information includes at least one of a mobility or an energy efficiency type of the first device;
    receiving a write request message requesting writing of characteristic information for setting the role determined based on the type information from the control device,
    wherein the write request massage includes configuration information indicating the role;
    transmitting a response message in response to the write request message;
    transmitting an advertising message including role information indicating the set role to neighboring nodes comprising the mesh network; and
    transmitting a first message including first information related to the first device to a second device comprising the mesh network,
    wherein the role is determined based on at least one of the motility or the energy efficiency type.

2. The method of claim 1, wherein if the second device performs a relay function, the first information includes first routing information for updating a routing table.

3. The method of claim 2, wherein the first routing information includes destination information of a message and device information indicating a next device transmitting the message according to the destination information.

4. The method of claim 2, further comprising:
    transmitting a request message to request second information related to the second device to the second device; and
    receiving a second message including the second information in response to the request message, wherein the second information includes an ID indicating the second device.

5. The method of claim 4, wherein the second information includes second routing information for configuring a routing table.

6. The method of claim 5, wherein the second routing information includes destination information of a message and device information indicating next device transmitting the message according to the destination information.

7. The method of claim 1, wherein if the second device does not perform a relay function, the first information is control information for controlling the first device.

8. The method of claim 7, further comprising:
receiving a Second message including second information related to the second device from the second device; and
transmitting a response message in response to the second message,
wherein the second information includes an ID indicating the second device.

9. The method of claim 8, further comprising:
transmitting the second message to at least one surrounding device.

10. The method of claim 7, further comprising:
receiving a request message to request network information related to the mesh network from the second device; and
transmitting a response message including the network information in response to the request message,
wherein the network information includes at least one of routing information related to a routing table of the second device or a network ID indicating the mesh network.

11. The method of claim 1 further comprising:
receiving a read request message to request role information of the first device from the control device; and
transmitting a response message including the role information in response to the read request message.

12. A first device for setting a role of a device in a mesh network, the first device comprising:
a transceiver; and
a processor functionally connected to the transceiver,
wherein the processor is configured to:
control the transceiver to transmit type information for determining the role of the first device to a control device,
wherein the type information includes at least one of a mobility or an energy efficiency type of the first device,
control the transceiver to receive a write request message requesting writing of characteristic information for setting the role determined based on the type information from the control device,
wherein the write request message includes configuration information indicating the role,
control the transceiver to transmit a response message in response to the write request message,
control the transceiver to transmit an advertising message including role information indicating the set role to neighboring nodes comprising the mesh network, and
control the transceiver to transmit a first message including first information related to the first device to the second device comprising the mesh network,
wherein the role is determined based on at least one of the mobility or the energy efficiency type.

13. The method of claim 1,
wherein the first device performs a relay operation of a message transmitted from the neighboring nodes according the set role.

* * * * *